United States Patent
Suzuki et al.

(10) Patent No.: US 11,421,706 B2
(45) Date of Patent: Aug. 23, 2022

(54) CENTRIFUGAL BLOWER

(71) Applicant: DENSO CORPORATION, Kariya (JP)

(72) Inventors: Yuya Suzuki, Kariya (JP); Sho Kosaka, Kariya (JP); Shuzo Oda, Kariya (JP); Shouichi Imahigashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/129,652

(22) Filed: Dec. 21, 2020

(65) Prior Publication Data

US 2021/0108652 A1  Apr. 15, 2021

Related U.S. Application Data

(63) Continuation of application No. PCT/JP2019/023495, filed on Jun. 13, 2019.

(30) Foreign Application Priority Data

Jul. 12, 2018  (JP) .............................. JP2018-132470
Feb. 7, 2019  (JP) .............................. JP2019-020906

(51) Int. Cl.
  *F04D 29/42*  (2006.01)
  *F04D 17/16*  (2006.01)
  (Continued)

(52) U.S. Cl.
  CPC ....... *F04D 29/4226* (2013.01); *F04D 17/168* (2013.01); *F04D 29/24* (2013.01); *F04D 29/4213* (2013.01); *F04D 29/441* (2013.01)

(58) Field of Classification Search
  CPC .... F04D 29/4226; F04D 17/168; F04D 29/24; F04D 29/4213; F04D 29/441; F04D 29/281
  See application file for complete search history.

(56) References Cited

U.S. PATENT DOCUMENTS 4,265,592 A * 5/1981 Carlini .................. F04D 29/464
                                                    415/206
6,651,431 B1 * 11/2003 Yang ....................... F02B 37/12
                                                     60/605.1
(Continued)

FOREIGN PATENT DOCUMENTS

JP  2000203235 A  7/2000
JP  2004132342 A  4/2004
(Continued)

*Primary Examiner* — Syed O Hasan
(74) *Attorney, Agent, or Firm* — Harness, Dickey & Pierce, P.L.C.

(57) ABSTRACT

A centrifugal blower includes: a centrifugal fan having plural blades arranged around a fan axis and a separation plate to blow out air in a radial direction after being sucked from one side in an axial direction; a fan casing housing the centrifugal fan; a partition plate that defines a first air passage and a second air passage arranged on the other side of the first air passage in the axial direction; and a separation cylinder arranged inside the plural blades in the radial direction. The separation cylinder expands in the radial direction as extending toward the other side in the axial direction, and is shaped to extend outward in the radial direction obliquely to the axial direction at the other end position of the separation cylinder positioned at the other end in the axial direction.

9 Claims, 12 Drawing Sheets

(51) Int. Cl.
*F04D 29/44* (2006.01)
*F04D 29/24* (2006.01)

(56) References Cited

U.S. PATENT DOCUMENTS

| | | | |
|---|---|---|---|
| 2010/0189547 A1* | 7/2010 | Shirahama | F04D 29/664 |
| | | | 415/119 |
| 2015/0063989 A1* | 3/2015 | Wang | F04D 27/0246 |
| | | | 415/206 |
| 2019/0293081 A1* | 9/2019 | Imahigashi | F04D 29/703 |
| 2019/0293082 A1 | 9/2019 | Imahigashi et al. | |

FOREIGN PATENT DOCUMENTS

| | | | |
|---|---|---|---|
| JP | 2017538886 A | 12/2017 | |
| JP | 2019173570 A | 10/2019 | |
| JP | 2019173571 A | 10/2019 | |
| KR | 20030052492 A | 6/2003 | |
| WO | WO-2020013288 A1 | 1/2020 | |

* cited by examiner

CENTRIFUGAL BLOWER

CROSS REFERENCE TO RELATED APPLICATIONS

The present application is a continuation application of International Patent Application No. PCT/JP2019/023495 filed on Jun. 13, 2019, which designated the U.S. and claims the benefit of priority from Japanese Patent Application No. 2018-132470 filed on Jul. 12, 2018 and Japanese Patent Application No. 2019-20906 filed on Feb. 7, 2019. The entire disclosures of all of the above applications are incorporated herein by reference.

TECHNICAL FIELD

The present disclosure relates to a centrifugal blower.

BACKGROUND

A centrifugal blower is provided in an air conditioner, using a two-layer inside/outside air flow, for a vehicle. The centrifugal blower includes a centrifugal fan and a separation cylinder. The centrifugal fan has plural blades and rotates around a fan axis. The separation cylinder is arranged inside the blades in the radial direction of the centrifugal fan.

SUMMARY

According to one aspect of the present disclosure, a centrifugal blower includes a centrifugal fan, a fan casing, a partition plate, and a separation cylinder. The centrifugal fan has a plurality of blades arranged around a fan axis and a separation plate to blow out air in a radial direction after being sucked from one side in an axial direction of the fan axis. The fan casing houses the centrifugal fan, and has: a suction port arranged on the one side in the axial direction of the centrifugal fan, through which air sucked into the centrifugal fan passes; and a blown air passage provided outside the centrifugal fan in the radial direction, through which the air blown from the centrifugal fan flows. The partition plate partitions the blown air passage between a first air passage and a second air passage arranged on the other side of the first air passage in the axial direction. The separation cylinder is arranged inside the plurality of blades in the radial direction of the centrifugal fan and has a tubular shape extended in the axial direction. The separation cylinder separates the air passing through the suction port into an inner air flowing inside the separation cylinder in the radial direction and an outer air flowing outside the separation cylinder in the radial direction. The separation plate has a plate shape that expands in the radial direction, such that the outer air flows on the one side in the axial direction with respect to the separation plate between the plurality of blades, and that the inner air flows on the other side in the axial direction with respect to the separation plate. The partition plate is arranged so that the outer air flows from the centrifugal fan into the first air passage and the inner air flows from the centrifugal fan into the second air passage. The separation cylinder expands in the radial direction as extending toward the other side in the axial direction, and is shaped to extend obliquely to the axial direction outward in the radial direction at the other end position of the separation cylinder positioned at the other end in the axial direction.

DESCRIPTION OF EMBODIMENT

Figure 1:
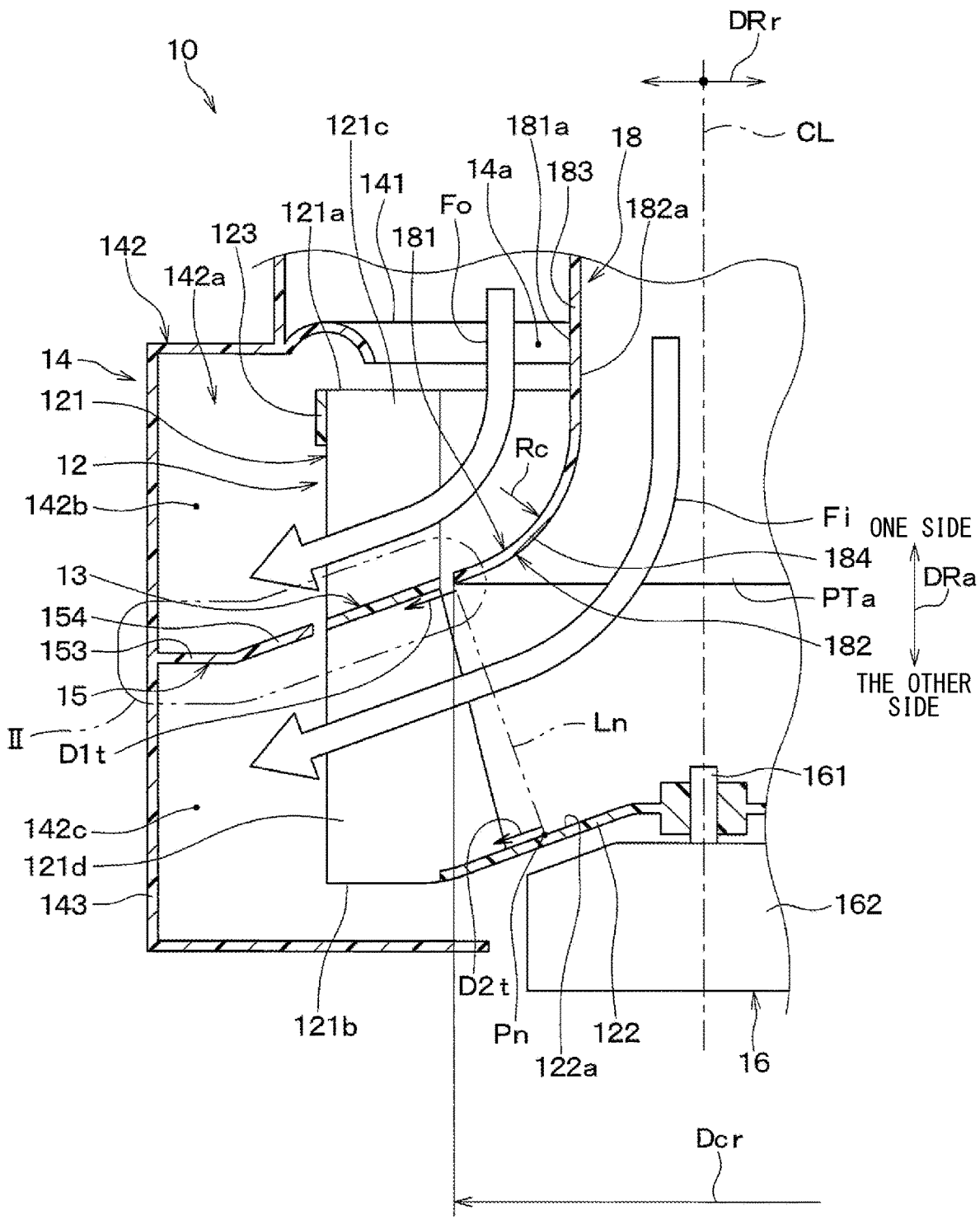
FIG. 1 is a cross-sectional view showing a schematic configuration of a centrifugal blower according to a first embodiment, taken along a vertical cross section including a fan axis of the centrifugal blower.

To begin with, examples of relevant techniques will be described.

A centrifugal blower is applied to an air conditioner, using a two-layer inside/outside air flow, for a vehicle. In the centrifugal blower, the two air flows can be drawn from one side at the same time in the separated manner. The centrifugal blower includes a centrifugal fan and a separation cylinder. The centrifugal fan has plural blades and rotates around a fan axis. The separation cylinder is arranged inside the blades in the radial direction of the centrifugal fan.

The separation cylinder has a substantially cylindrical shape with the fan axis, and divides the air passage from the suction port of the scroll casing to the centrifugal fan into two air passages. The separation cylinder is shaped to expand in the radial direction of the centrifugal fan as extending from the suction port toward the centrifugal fan in the axial direction of the fan axis. Further, the end of the separation cylinder adjacent to the centrifugal fan is shaped to extend orthogonal to the fan axis outward in the radial direction.

In the centrifugal blower, the flow of air from the suction port to the centrifugal fan is directed from the axial direction to the radial direction, outward along the curved shape of the separation cylinder, and is drawn between the blades of the centrifugal fan. Since the flow direction of the air is forcibly changed by the separation cylinder in this way, a pressure loss occurs in the air flow along the separation cylinder at the position near the end of the separation cylinder facing the centrifugal fan. As a result of detailed studies by the inventors, the above issues have been found.

The present disclosure provides a centrifugal blower capable of reducing the pressure loss caused in the air flow by the separation cylinder.

According to one aspect of the present disclosure, a centrifugal blower includes a centrifugal fan, a fan casing, a partition plate, and a separation cylinder. The centrifugal fan has a plurality of blades arranged around a fan axis and a separation plate to blow out air in a radial direction after being sucked from one side in an axial direction of the fan axis. The fan casing houses the centrifugal fan, and has: a suction port arranged on the one side in the axial direction of the centrifugal fan, through which air sucked into the centrifugal fan passes; and a blown air passage provided outside the centrifugal fan in the radial direction, through which the air blown from the centrifugal fan flows. The partition plate partitions the blown air passage between a first air passage and a second air passage arranged on the other side of the first air passage in the axial direction. The separation cylinder is arranged inside the plurality of blades in the radial direction of the centrifugal fan and has a tubular shape facing the axial direction. The separation cylinder separates the air passing through the suction port into an inner air flowing inside the separation cylinder in the radial direction and an outer air flowing outside the separation cylinder in the radial direction. The separation plate has a plate shape that expands in the radial direction, such that the outer air flows on the one side in the axial direction with respect to the separation plate between the plurality of blades, and that the inner air flows on the other side in the axial direction with respect to the separation plate. The partition plate is arranged so that the outer air flows from the centrifugal fan into the first air passage and the inner air flows from the centrifugal fan into the second air passage. The separation cylinder expands in the radial direction as extending toward the other side in the axial direction, and is shaped to extend obliquely to the axial direction outward in the radial direction at the other end position of the separation cylinder positioned at the other end in the axial direction.

Thus, it is possible to gently change the flow direction of the air flowing along the separation cylinder toward spaces between the blades, as compared with the case where the separation cylinder is shaped to extend orthogonal to the axial direction and expands outward in the radial direction at the other end position of the separation cylinder. Therefore, it is possible to reduce the pressure loss caused by deflection in the air flow along the separation cylinder without increase in the outer diameter of the separation cylinder.

Reference symbols attached to components or the like show an example of the correspondence of the components or the like and a specific constituent element or the like described in embodiments to be described later.

Hereinafter, embodiments will be described with reference to the drawings. In the following embodiments, the same reference numeral is given to the same or equivalent parts in the drawings.

First Embodiment

A centrifugal blower 10 of the present embodiment shown in FIG. 1 is applied to an air conditioner for a vehicle, in which inside/outside air flows in a two-layer. The air conditioner can draw air in the cabin (that is, inside air) and air outside the cabin (that is, outside air) simultaneously in separated manner. In the following description, the centrifugal blower 10 is simply referred to as a blower 10.

As shown in FIG. 1, the blower 10 includes a centrifugal fan 12, a fan casing 14, a motor 16, and a separation cylinder 18. The centrifugal fan 12 rotates around the fan axis CL. As the centrifugal fan 12 rotates, the centrifugal fan 12 blows out air sucked from one side in the axial direction DRa of the fan axis CL outward in the radial direction DRr of the centrifugal fan 12. FIG. 1 shows a vertical cross section in which the centrifugal fan 12, the fan casing 14, and the separation cylinder 18 are cut in a plane including the fan axis CL. In other words, FIG. 1 is a vertical cross section in which the blower 10 is cut in a plane including the fan axis CL. In the following description, the vertical section will be referred to as a vertical section of the blower 10 or a vertical section of FIG. 1.

In the present embodiment, the axial direction DRa of the fan axis CL, that is, the axial direction DRa of the centrifugal fan 12 is referred to as the fan axial direction DRa. Further, the radial direction DRr of the fan axis CL, that is, the radial direction DRr of the centrifugal fan 12 is referred to as a fan radial direction DRr. The fan radial direction DRr is perpendicular to the fan axial direction DRa.

The centrifugal fan 12 has plural blades 121, a main plate 122, a reinforcing member 123, and a separation plate 13. The blades 121 are arranged side by side around the fan axis CL. Each of the blades 121 has one end 121a in the fan axial direction DRa and the other end 121b in the fan axial direction DRa.

The main plate 122 is shaped to extend in the fan radial direction DRr. In short, the main plate 122 has a disk shape coaxial with the fan axis CL. The main plate 122 is arranged on the other side of the separation cylinder 18 in the fan axial direction DRa. The rotation shaft 161 of the motor 16 is connected to the central portion of the main plate 122 so as not to rotate relative to each other. The other end 121b of the blade 121 is fixed to the outer portion of the main plate 122 in the fan radial direction DRr.

The main plate 122 has a main plate guide surface 122a on one side in the fan axial direction DRa. The main plate guide surface 122a faces the one side in the fan axial direction DRa and extends in the fan radial direction DRr.

The reinforcing member 123 reinforces the centrifugal fan 12. The reinforcing member 123 forms an annular shape about the fan axis CL. The reinforcing member 123 is fixed on the radially outer portion of each of the blades 121 at a side adjacent to the one end 121a.

The separation plate 13 separates the air flowing between the blades 121 into air flowing on one side of the separation plate 13 in the fan axial direction DRa and air flowing on the other side of the separation plate 13 in the fan axial direction DRa.

Specifically, the separation plate 13 intersects each of the blades 121 and extends in an annular shape around the fan axis CL. The separation plate 13 has a plate shape that extends in the fan radial direction DRr. Each of the blades 121 and the separation plate 13 are fixed to each other at a portion where the blade 121 and the separation plate 13 intersect. In the present embodiment, the plural blades 121, the main plate 122, the reinforcing member 123, and the separation plate 13 are configured as an integrally molded product made of resin.

Figure 2:
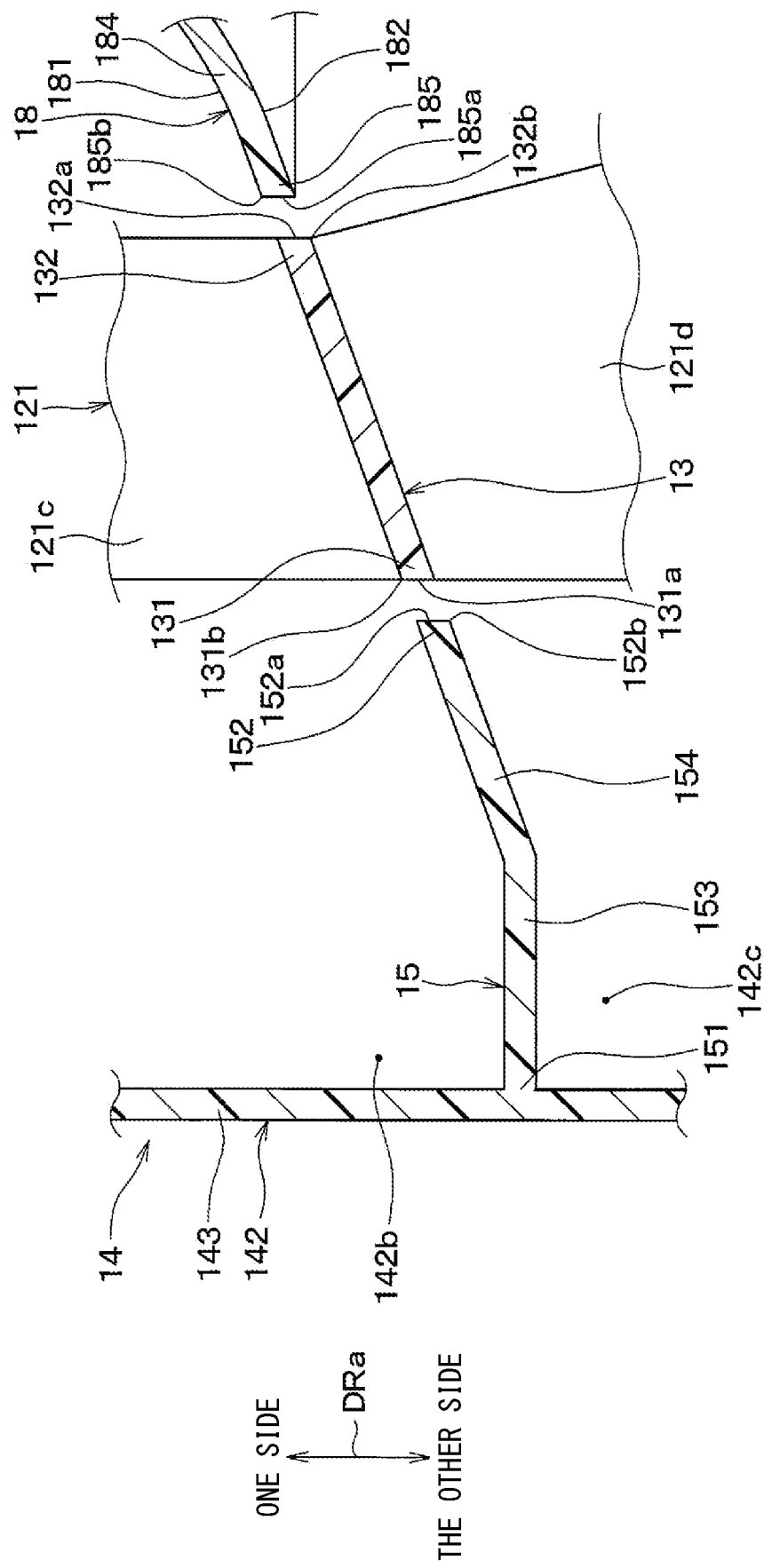
FIG. 2 is an enlarged view showing an area II of FIG. 1.

As shown in FIGS. 1 and 2, the separation plate 13 has a separation outer end 131 provided on the outer side in the fan radial direction DRr and a separation inner end 132 provided on the inner side in the fan radial direction DRr. The separation outer end 131 has an outer end surface 131a facing outward in the fan radial direction DRr. The outer end surface 131a is a ring-shaped end surface extending from one side to the other side in the fan axial direction DRa at the outer end position of the separation plate 13 in the fan radial direction DRr.

The separation inner end 132 has an inner end surface 132a facing inward in the fan radial direction DRr. The inner end surface 132a is a ring-shaped end surface extending from one side to the other side in the fan axial direction DRa at the inner end position of the separation plate 13 in the fan radial direction DRr.

The separation inner end 132 is located on one side in the fan axial direction DRa than the separation outer end 131. Specifically, the separation plate 13 is continuously extended so as to be located on the other side in the fan axial direction DRa as extended outward in the fan radial direction DRr. In the vertical cross section of FIG. 1, the separation plate 13 is inclined with respect to the fan axis CL and extends linearly from the separation inner end 132 to the separation outer end 131.

In the present embodiment, the one side portion 121c of the blade 121 located on the one side in the fan axial direction DRa with respect to the separation plate 13 has an airfoil of a sirocco fan. Similarly, the other side portion 121d of the blade 121 located on the other side in the fan axial direction DRa with respect to the separation plate 13 has also an airfoil of a sirocco fan.

The fan casing 14 functions as a housing forming the outer shell of the blower 10, and houses the centrifugal fan 12 inside the fan casing 14. The fan casing 14 has a suction port 14a through which air sucked into the centrifugal fan 12 passes. The suction port 14a is arranged on one side in the fan axial direction DRa with respect to the centrifugal fan 12.

The fan casing 14 has a bell mouth 141 that forms a peripheral portion of the suction port 14a. The cross-sectional shape of the bell mouth 141 is arcuate so that air can flow smoothly through the suction port 14a.

The fan casing 14 has a passage portion 142 and a partition plate 15. The passage portion 142 includes a blown air passage 142a provided outside the centrifugal fan 12 in the fan radial direction DRr. The air blown out from the centrifugal fan 12 collects and flows in the blown air passage 142a. For example, the blown air passage 142a is formed in a spiral shape around the centrifugal fan 12. The fan casing 14 is also called a scroll casing.

The passage portion 142 has an outer peripheral wall 143 extending in the fan axial direction DRa around the centrifugal fan 12. The outer peripheral wall 143 faces the blown air passage 142a from the outer side in the fan radial direction DRr.

The partition plate 15 is provided inside the blown air passage 142a. The partition plate 15 partitions the blown air passage 142a into a first air passage 142b arranged on one side in the fan axial direction DRa with respect to the partition plate 15 and a second air passage 142c arranged on the other side in the fan axial direction DRa with respect to the partition plate 15.

The partition plate 15 has a plate shape extending in the fan radial direction DRr. The partition plate 15 has a partition outer end 151 provided on the outer side in the fan radial direction DRr and a partition inner end 152 provided on the inner side in the fan radial direction DRr. The partition outer end 151 is connected to the outer peripheral wall 143. That is, the partition plate 15 extends from the outer peripheral wall 143 toward the centrifugal fan 12. A base end of the partition plate 15 is the partition outer end 151. In the present embodiment, the passage portion 142 and the partition plate 15 are integrally formed as an integrally molded product made of resin. The thickness of the partition plate 15, the thickness of the separation plate 13, and the thickness of the separation cylinder 18 are, for example, the same or substantially the same.

The partition inner end 152 has a partition end surface 152a facing inward in the fan radial direction DRr. The partition end surface 152a is a ring-shaped end surface extending from one side to the other side in the fan axial direction DRa at the inner end position of the partition plate 15 in the fan radial direction DRr.

The partition plate 15 has a partition outer portion 153 and a partition inner portion 154 located on the inner side of the partition outer portion 153 in the fan radial direction DRr. The partition inner portion 154 is connected in series with the partition outer portion 153. The partition outer portion 153 includes the partition outer end 151, and the partition inner portion 154 includes the partition inner end 152.

The partition outer portion 153 is shaped to expand only in the fan radial direction DRr without being displaced in the fan axial direction DRa. That is, the partition outer portion 153 has a shape that extends in a direction orthogonal to the fan axial direction DRa. In other words, the partition outer portion 153 is shaped to extend along a direction orthogonal to the fan axial direction DRa. Therefore, the partition plate 15 has a shape that expands along the direction orthogonal to the fan axial direction DRa at the position of the partition outer end 151.

The partition inner portion 154 extends so as to be located on the other side in the fan axial direction DRa as extended outward in the fan radial direction DRr. Further, in the vertical cross section of FIG. 1, the partition inner portion 154 is inclined with respect to the fan axis CL and extends linearly. Therefore, the partition inner portion 154 is bent at the boundary between the partition inner portion 154 and the partition outer portion 153 and is connected to the partition outer portion 153.

That is, in the vertical cross section of FIG. 1, the partition plate 15 is formed such that the angle formed by the partition plate 15 with respect to the fan axis CL gradually approaches 90 degrees (orthogonal to the fan axis CL) as the partition plate 15 is extended from the partition inner end 152 outward in the fan radial direction DRr.

The partition outer portion 153 and a part of the partition inner portion 154 excluding the partition inner end 152 are located on the other side in the fan axial direction DRa with respect to the partition inner end 152. Furthermore, the partition outer portion 153 is located the most other side in the fan axial direction DRa, of the partition plate 15. The partition outer end 151 is located on the other side in the fan axial direction DRa with respect to the partition inner end 152.

In the vertical cross section of FIG. 1, the inclination angle of the partition inner portion 154 with respect to the fan axis CL is the same as the inclination angle of the separation plate 13.

The motor 16 is an electric drive device that rotates the centrifugal fan 12. The motor 16 has a rotation shaft 161 and a main body 162. The rotation shaft 161 extends from the main body 162 toward the one side in the fan axial direction DRa. As the rotation shaft 161 rotates, the centrifugal fan 12 rotates. The main body 162 is fixed to the fan casing 14. The main body 162, the fan casing 14, and the separation cylinder 18 are non-rotating members that do not rotate.

The separation cylinder 18 is a tubular member that extends in the fan axial direction DRa. In short, the separation cylinder 18 has a tubular shape facing the fan axial direction DRa. Further, the separation cylinder 18 having a tubular shape is open at one end and the other end in the fan axial direction DRa. The separation cylinder 18 is arranged inside the bell mouth 141 and the blades 121 of the centrifugal fan 12 in the fan radial direction DRr. The separation cylinder 18 is arranged by inserting a part of the separation cylinder 18 into the fan casing 14 through the suction port 14a. The separation cylinder 18 is fixed to, for example, the fan casing 14.

Due to the shape and arrangement, the separation cylinder 18 separates the air flow from the suction port 14a toward the centrifugal fan 12 into two air flows. The separation cylinder 18 divides the air passage from the suction port 14a to the centrifugal fan 12 into two air passages. That is, the separation cylinder 18 separates the air passing through the suction port 14a into an inner air flowing on the inner side in the fan radial direction DRr with respect to the separation cylinder 18 and an outer air flowing on the outer side in the fan radial direction DRr with respect to the separation cylinder 18. In FIG. 1, the flow of the outer air is represented by the arrow Fo, and the flow of the inner air is represented by the arrow Fi.

The separation cylinder 18 is shaped to extend in the fan radial direction DRr as extended toward the other side in the fan axial direction DRa in order to guide the inner air and the outer air between the blades 121. That is, the diameter of the separation cylinder 18 increases as extending from the one side to the other end in the fan axial direction DRa, at the other side of the separation cylinder 18 in the fan axial direction DRa.

Specifically, the separation cylinder 18 has a one side portion 183 and the other side portion 184 disposed on the other side in the fan axial direction DRa with respect to the one side portion 183. The other side portion 184 is connected in series with the one side portion 183. The one side portion 183 extends along the fan axial direction DRa without changing the diameter of the separation cylinder 18.

The other side portion 184 of the separation cylinder 18 extends from the one side to the other side in the fan axial direction DRa while bending so as to expand outward in the fan radial direction DRr. The separation cylinder 18 is shaped to expand outward in the fan radial direction DRr obliquely to the fan axial direction DRa at the other end position PTa of the separation cylinder, which is the position of the other end of the separation cylinder 18 on the other side in the fan axial direction DRa. The other end position PTa of the separation cylinder is also the other end position of the other side portion 184 in the fan axial direction DRa.

The separation cylinder 18 has a cylinder other end 185 provided on the other side in the fan axial direction DRa. The cylinder other end 185 is included in the other side portion 184 of the separation cylinder 18, and is also a radially outer end of the separation cylinder 18 provided on the outer side in the fan radial direction DRr.

The cylinder other end 185 has a cylinder end surface 185a facing outward in the fan radial direction DRr. The cylinder end surface 185a is a ring-shaped end surface extending from one side to the other side in the fan axial direction DRa at the other end position PTa of the separation cylinder.

Since the separation cylinder 18 has a tubular shape as described above, the separation cylinder 18 has the cylinder outer surface 181 formed as the outer wall surface of the cylinder shape and the cylinder inner surface 182 formed as the inner wall surface of the cylinder shape. Both the cylinder outer surface 181 and the cylinder inner surface 182 are formed to extend from the one side portion 183 to the other side portion 184.

The cylinder outer surface 181 extends to the other end position PTa of the separation cylinder, and includes the outward surface 181a facing outward in the fan radial direction DRr. In other words, the cylinder outer surface 181 includes the outward surface 181a and extends to the cylinder other end 185. The outward surface 181a is an outer wall surface of the one side portion 183 of the separation cylinder 18, and extends in the fan axial direction DRa along the fan axis CL.

The cylinder inner surface 182 extends to the other end position PTa of the separation cylinder, and includes the inward surface 182a facing inward in the fan radial direction DRr. In other words, the cylinder inner surface 182 includes the inward surface 182a and extends to the cylinder other end 185. The inward surface 182a is an inner wall surface of the one side portion 183 of the separation cylinder 18, and extends in the fan axial direction DRa along the fan axis CL.

As shown by the arrow Fi, the main plate guide surface 122a guides the inner air so that the inner air flows outward in the fan radial direction DRr at the upstream side of the blades 121 in the air flow. Then, in the vertical cross section of FIG. 1, the normal Ln of the cylinder inner surface 182 at the other end position PTa of the separation cylinder intersects the main plate guide surface 122a at an intersection Pn. The intersection Pn is defined as a main plate guide surface intersection Pn. In the vertical cross section of FIG. 1, the tangential direction D1t of the cylinder inner surface 182 obtained at the other end position PTa of the separation cylinder is the same as the tangential direction D2t of the main plate guide surface 122a obtained at the main plate guide surface intersection Pn. More specifically, the tangential direction D1t of the cylinder inner surface 182 is parallel to the tangential direction D2t of the main plate guide surface 122a.

As shown in FIG. 1, the separation plate 13 is arranged to separate the flow of outer air Fo and the flow of inner air Fi from each other in the fan axial direction DRa at the downstream side of the separation cylinder 18 in the air flow. That is, the separation plate 13 is arranged so that outer air Fo flows on one side of the separation plate 13 in the fan axial direction DRa, between the blades 121, and the inner air Fi flows on the other side of the separation plate 13 in the fan axial direction DRa.

The partition plate 15 is arranged so as to separate the outer air Fo and the inner air Fi in the fan axial direction DRa at the downstream side of the centrifugal fan 12 in the air flow. That is, the partition plate 15 is arranged so that the outer air Fo flows from the centrifugal fan 12 into the first air passage 142*b* and the inner air Fi flows into the second air passage 142*c*.

In short, the separation plate 13 and the partition plate 15 are arranged so as to restrict the outer air and the inner air from mixing with each other on the downstream side in the air flow with respect to the separation cylinder 18.

As shown in FIG. 1, a gap is defined between the separation plate 13 and the separation cylinder 18 and a gap is defined between the separation plate 13 and the partition plate 15 to allow relative rotation. In details, much more outer air flows between the blades 121 on one side in the fan axial direction DRa with respect to the separation plate 13 than the inner air. Further, much more inner air flows at the other side in the fan axial direction DRa with respect to the separation plate 13 than the outer air. The outer air flows from the centrifugal fan 12 into the first air passage 142*b* much more than the inner air, and the inner air flows into the second air passage 142*c* much more than the outer air.

In order to separate the outer air and the inner air as described above, specifically, as shown in FIG. 2, the other end 132*b* of the inner end surface 132*a* of the separation plate 13 is located on the other side than the one side end 185*b* of the cylinder end surface 185*a* in the fan axial direction DRa.

More specifically, in the vertical cross section of the blower 10, if the cylinder other end 185 and the separation inner end 132 are linearly connected by imaginary line, the separation plate 13 is arranged continuous from the separation cylinder 18. The "continuous connection" means not only that there are no steps or bends at all, but also that the separation plate 13 and the separation cylinder 18 are continuous with a slight step or a slight bend as compared with the thickness of the separation plate 13 and the separation cylinder 18. This also applies to the "continuous connection" between the separation plate 13 and the partition plate 15, which will be described later.

In the fan axial direction DRa, the one side end 131*b* of the outer end surface 131*a* of the separation plate 13 is located on the one side than the other side end 152*b* of the partition end surface 152*a*. More specifically, in the vertical cross section of the blower 10, if the separation outer end 131 and the partition inner end 152 are linearly complemented to connect with each other, the separation plate 13 is arranged to continuous from the partition plate 15.

In the blower 10 of the present embodiment, when the centrifugal fan 12 is rotated by the motor 16, air is sucked from the one side of the centrifugal fan 12 in the axial direction DRa into the centrifugal fan 12 in the fan radial direction DRr. The sucked air is blown out from the centrifugal fan 12 outward in the fan radial direction DRr. The air blown out from the centrifugal fan 12 flows through the blown air passage 142*a* of the fan casing 14, and then is blown out from the outlet of the fan casing 14.

At this time, as shown in FIG. 1, the outer air Fo and the inner air Fi flow in the separated state inside the blower 10, due to the separation cylinder 18, the separation plate 13, and the partition plate 15.

The air blown out from the blower 10 flows through an air conditioning casing (not shown) of the air conditioner. A temperature controller that adjusts the air temperature is arranged inside the air conditioning casing. The air blown out from the blower 10 is blown out into the cabin after the temperature is adjusted by the temperature controller. Even inside the air conditioning casing, the flow of outer air flow and the flow of inner air are separated. Then, after the temperature of each of the air flows is adjusted, the air flows are blown into the cabin, for example, from different outlets.

According to the present embodiment, as shown in FIG. 1, the separation cylinder 18 expands in the fan radial direction DRr as extended toward the other side in the fan axial direction DRa. The separation cylinder 18 is shaped to expand outward in the fan radial direction DRr obliquely to the fan axial direction DRa at the other end position PTa of the separation cylinder 18.

Figure 3:
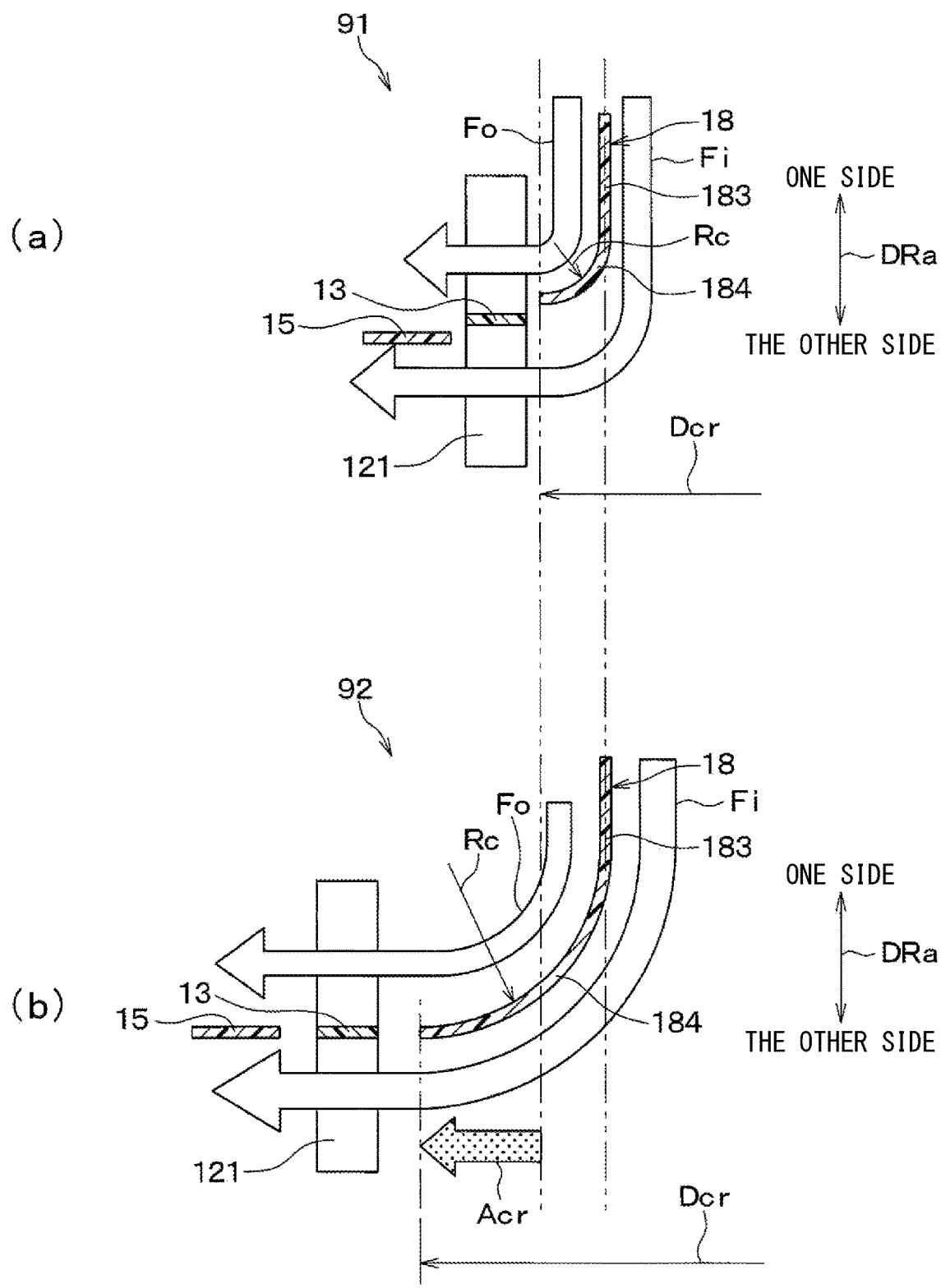
FIG. 3 is schematic cross-sectional views showing (a) a first comparative example compared with the first embodiment and (b) a second comparative example compared with the first embodiment.

Therefore, for example, compared with a blower 91 of a first comparative example shown in (a) of FIG. 3, the radius of curvature Rc of the other side portion 184, whose diameter is expanded in the separation cylinder 18, can be increased. That is, in comparison with the blower 91 of the first comparative example, it is possible to gently change the flow direction of the air along the separation cylinder 18 to travel between the blades 121. Therefore, in the present embodiment, it is possible to reduce the pressure loss caused by the deflection in the air flow along the separation cylinder 18 without increase in the outer edge diameter Dcr of the separation cylinder 18.

As in a blower 92 of a second comparative example shown in (b) of FIG. 3, it is possible to increase the radius of curvature Rc of the other side portion 184 by increasing the outer edge diameter Dcr as shown by the arrow Acr with respect to the blower 91 of the first comparative example. However, in this case, the physique of the blower 92 will be increased. In contrast, the separation cylinder 18 of the present embodiment shown in FIG. 1 is shaped to expand outward in the fan radial direction DRr obliquely to the fan axial direction DRa at the other end position PTa of the separation cylinder 18. Therefore, it is possible to increase the radius of curvature Rc of the other side portion 184 without increase in the outer edge diameter Dcr of the separation cylinder 18.

As shown in (a) and (b) of FIG. 3, the separation cylinder 18 of the blower 91, 92 of the first and second comparative examples are shaped to expand outward in the fan radial direction DRr and are orthogonal to the fan axial direction DRa at the other end position PTa of the separation cylinder 18 (see FIG. 1). Further, in (a) and (b) of FIG. 3, only one side of the vertical cross section of the blower 91, 92 with respect to the fan axis CL is illustrated, which is the same in the later described drawings.

According to the present embodiment, as shown in FIGS. 1 and 2, the separation inner end 132 of the separation plate 13 is located at the one side in the fan axial direction DRa with respect to the separation outer end 131. Therefore, it is possible to reduce the pressure loss caused by colliding with the separation plate 13 by the outer air having a velocity component flowing along the cylinder outer surface 181 and directed to the other side in the fan axial direction DRa.

According to the present embodiment, the partition plate 15 has the partition outer portion 153, and the partition outer portion 153 is included in a part of the partition plate 15 located on the other side in the fan axial direction DRa with respect to the partition inner end 152.

Therefore, the air blown out from between the blades 121 can flow outward in the fan radial direction DRr obliquely to the fan axial direction DRa, around the partition inner end 152, while having a velocity component directed to the other side in the fan axial direction DRa. Therefore, it is possible to reduce the pressure loss caused by the outer air colliding with the partition plate 15 after blown out from between the blades 121.

According to the present embodiment, the fan casing 14 has the outer peripheral wall 143 facing the blown air passage 142a from the outer side in the fan radial direction DRr. Further, the partition plate 15 has the partition outer end 151 which is provided at the outer side in the fan radial direction DRr and is connected to the outer peripheral wall 143. Further, the partition plate 15 is shaped to extend along a direction orthogonal to the fan axial direction DRa at the position of the partition outer end 151.

Figure 4:
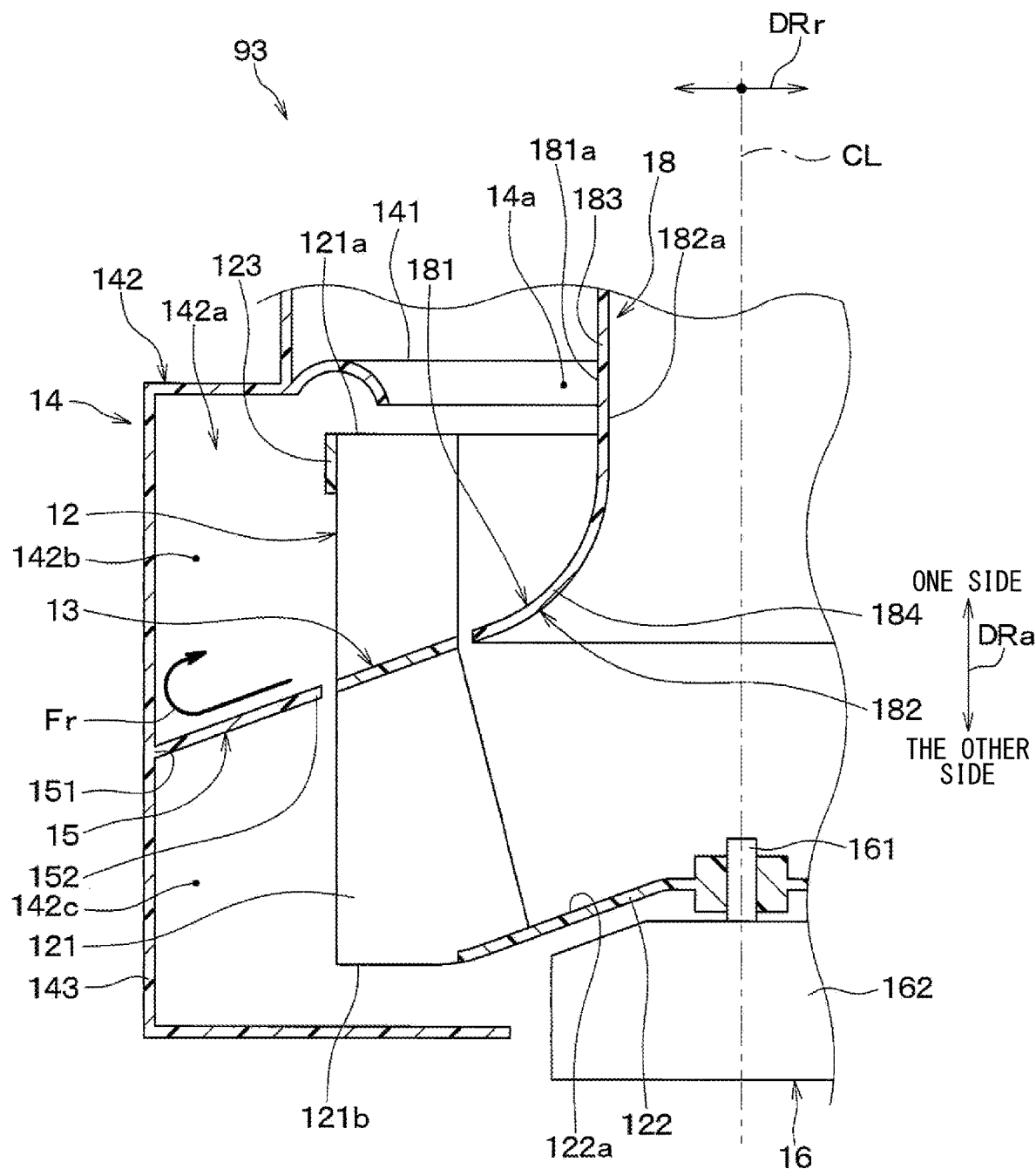
FIG. 4 is a vertical cross-sectional view showing a centrifugal blower of a third comparative example, corresponding to FIG. 1.

In the blower 93 of the third comparative example shown in FIG. 4, the partition plate 15 is shaped to extend outward in the fan radial direction DRr obliquely to the fan axial direction DRa, while facing the other side in the fan axial direction DRa, at the position of the partition outer end 151. According to the present embodiment, compared with the blower 93 of the third comparative example shown in FIG. 4, the flow direction of the outer air reaching the outer peripheral wall 143 of the fan casing 14 along the partition plate 15 can be restricted from sudden changing, for example, like the arrow Fr in FIG. 4. As a result, it is possible to improve the output of the blower 10.

According to the present embodiment, as shown in FIGS. 1 and 2, in the vertical cross section of the blower 10, the partition inner portion 154 includes the partition inner end 152, and is inclined to extend linearly so as to be located on the other side in the fan axial direction DRa as extended outward in the fan radial direction DRr. In contrast, the partition outer portion 153 is shaped to extend in a direction orthogonal to the fan axial direction DRa. That is, in the vertical cross section of the blower 10, the angle formed by the partition plate 15 with respect to the fan axis CL approaches 90 degrees (orthogonal to the fan axis CL) stepwise as extended outward in the fan radial direction DRr from the partition inner end 152.

Therefore, it is possible to gently change the flow direction of the air flowing along the partition plate 15 so as to approach the direction orthogonal to the fan axis and facing outward in the fan radial direction DRr. As a result, for example, it is possible to reduce the pressure loss caused by the outer air Fo blown out from the centrifugal fan 12 and colliding with the partition plate 15.

According to the present embodiment, as shown in FIG. 2, the other end 132b of the inner end surface 132a of the separation plate 13 is located on the other side in the fan axial direction DRa than the one side end 185b of the cylinder end surface 185a. Therefore, the air flows separated by the separation cylinder 18 are suppressed from mixing with each other through the gap between the cylinder 18 and the separation plate 13, compared with a case where the other end 132b of the inner end surface 132a is located on the one side than the one side end 185b of the cylinder end surface 185a.

According to the present embodiment, as shown in FIG. 2, the one side end 131b of the outer end surface 131a of the separation plate 13 is located on the one side in the fan axial direction DRa than the other side end 152b of the partition end surface 152a. Therefore, the air flows separated by the separation plate 13 are suppressed from mixing with each other through the gap between the partition plate 15 and the separation plate 13, compared with a case where the one side end 131b of the outer end surface 131a is located on the other side than the other side end 152b of the partition end surface 152a.

According to the present embodiment, in the vertical cross section of FIG. 1, the normal Ln of the cylinder inner surface 182 at the other end position PTa of the separation cylinder intersects the main plate guide surface 122a at the intersection Pn, which is defined as the main plate guide surface intersection Pn. In this case, in the vertical cross section of FIG. 1, the tangential direction D1t of the cylinder inner surface 182 obtained at the other end position PTa of the separation cylinder is the same as the tangential direction D2t of the main plate guide surface 122a obtained at the main plate guide surface intersection Pn.

In the flow path formed between the cylinder inner surface 182 and the main plate guide surface 122a for the inner air, the circumferential length of the flow path cross section about the fan axis CL becomes longer as going toward the downstream side. The change in the circumferential length acts to increase the cross-sectional area of the flow path as going toward the downstream side. Then, assuming that the tangential direction D1t of the cylinder inner surface 182 is closer to the direction orthogonal to the fan axis than the tangential direction D2t of the main plate guide surface 122a, the change in the height of the flow path cross section represented in the vertical cross section of FIG. 1 increases the expansion of the flow path cross section.

In contrast, in the present embodiment, the change in the height of the flow path cross section shown in the vertical cross section of FIG. 1 does not easily increase the expansion of the flow path cross section. Therefore, the rate of change in the cross-sectional area of the flow path through which the inner air flows can be reduced as compared with the above assumed case.

Figure 5:
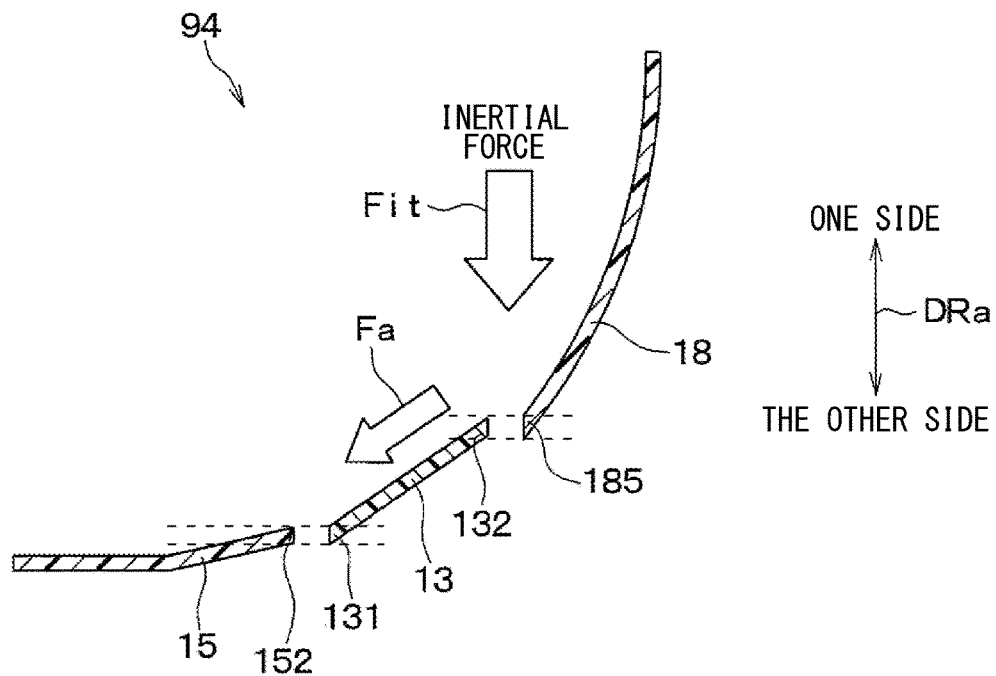
FIG. 5 is a schematic cross-sectional view showing a separation cylinder, a separation plate, and a partition plate in a vertical cross-sectional view of a centrifugal blower of a fourth comparative example.

The blower 94 of the fourth comparative example to be compared with the present embodiment is shown in FIG. 5. In the blower 94 of the fourth comparative example, the cylinder other end 185 and the separation inner end 132 are at the same position in the fan axial direction DRa, and the partition inner end 152 and the separation outer end 131 are at the same position in the fan axial direction DRa.

According to the present embodiment, as shown in FIGS. 1 and 2, the position of the separation inner end 132 is shifted toward the other side in the fan axial direction DRa relative to the position of the cylinder other end 185, as compared with the fourth comparative example. In the vertical cross section of the blower 10, the separation plate 13 is arranged continuously connected to the separation cylinder 18 when the cylinder other end 185 and the separation inner end 132 are linearly complemented to connect with each other.

Therefore, as compared with the fourth comparative example of FIG. 5, in the present embodiment, the outer air and the inner air flowing along the separation cylinder 18 can smoothly flow along the separation plate 13. Then, the size of the gap between the separation cylinder 18 and the separation plate 13 is minimized (specifically, zero) in the direction orthogonal to the flow of the outer air Fo and the inner air Fi in FIG. 1 at the position of the gap. Therefore, for example, as compared with the fourth comparative example, it is possible to improve the separability between the outer air and the inner air.

According to the present embodiment, as shown in FIGS. 1 and 2, the position of the partition inner end 152 is shifted to the other side in the fan axial direction DRa with respect to the position of the separation outer end 131, compared with the fourth comparative example. Then, in the vertical cross section of the blower 10, the separation plate 13 is arranged continuously connected to the partition plate 15 when the separation outer end 131 and the partition inner end 152 are complemented so as to linearly connect with each other.

Therefore, as compared with the fourth comparative example of FIG. 5, in the present embodiment, the outer air and the inner air flowing along the separation plate 13 can smoothly flow along the partition plate 15. Then, the size of the gap between the partition plate 15 and the separation plate 13 is minimized (specifically, zero) in the direction orthogonal to the flow of the outer air Fo and the inner air Fi in FIG. 1 at the position of the gap. Therefore, it is possible to improve the separability of the outer air and the inner air from each other, for example, as compared with the fourth comparative example.

Second Embodiment

A second embodiment of the present disclosure is described next. The present embodiment will be explained primarily with respect to portions different from those of the first embodiment. In addition, explanations of the same or equivalent portions as those in the above embodiment will be omitted or simplified. The same applies to a description of embodiments as described later.

Figure 6:
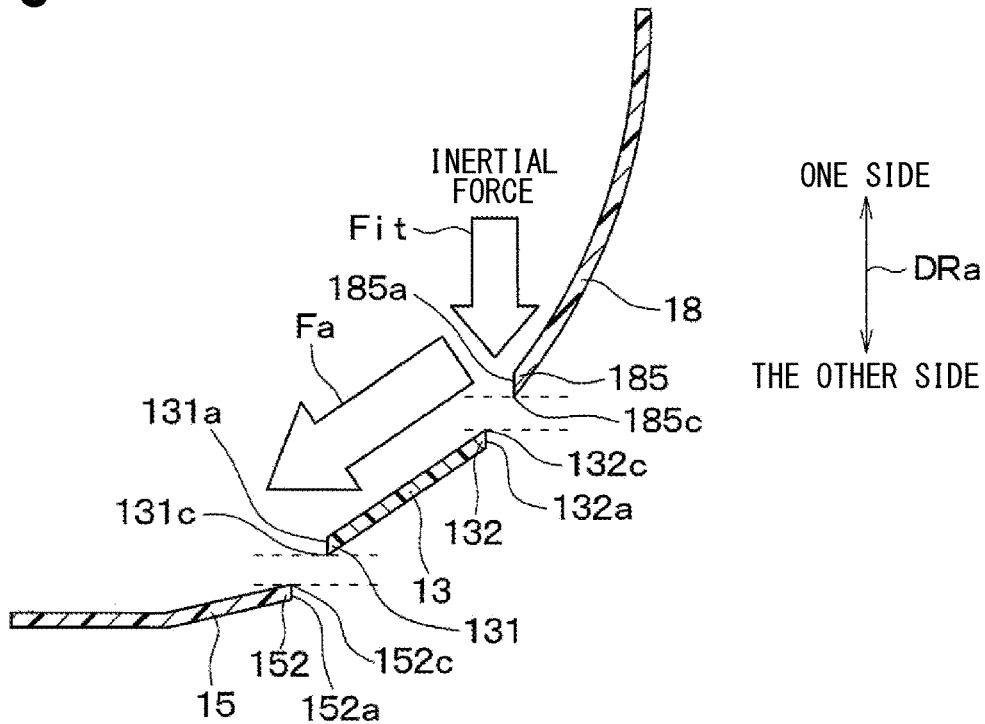
FIG. 6 is a diagram schematically showing a separation cylinder, a separation plate, and a partition plate in a vertical cross-sectional view of a centrifugal blower according to a second embodiment.

As shown in FIG. 6, in the present embodiment, the relative positional relationship between the separation cylinder 18, the separation plate 13, and the partition plate 15 in the fan axial direction DRa is different from that in the first embodiment.

Specifically, in the fan axial direction DRa, the one side end 132c of the inner end surface 132a of the separation plate 13 is located on the other side than the other side end 185c of the cylinder end surface 185a. Then, the other side end 131c of the outer end surface 131a of the separation plate 13 is located on the one side in the fan axial direction DRa relative to the one side end 152c of the partition end surface 152a.

Therefore, in the vertical cross section of the blower 10, if the cylinder other end 185 and the separation inner end 132 are linearly complemented to connect with each other, the separation plate 13 and the separation cylinder 18 are connected not continuous due to bending formed between the separation plate 13 and the separation cylinder 18. This also applies to the relative positional relationship between the separation plate 13 and the partition plate 15.

Aside from the above described aspects, the present embodiment is the same as the first embodiment. Further, in the present embodiment, the same effects as the first embodiment described above can be obtained in the same manner as in the first embodiment.

According to the present embodiment, in the fan axial direction DRa, the one side end 132c of the inner end surface 132a of the separation plate 13 is located on the other side relative to the other side end 185c of the cylinder end surface 185a. Therefore, when the outer air Fa flows along the separation plate 13, it is possible to improve the output of the blower 10 using the inertia Fit since the outer air tends to flow to the other side in the fan axial direction DRa.

Third Embodiment

A third embodiment is described next. The present embodiment will be explained mainly with respect to portions different from those of the first embodiment.

Figure 7:
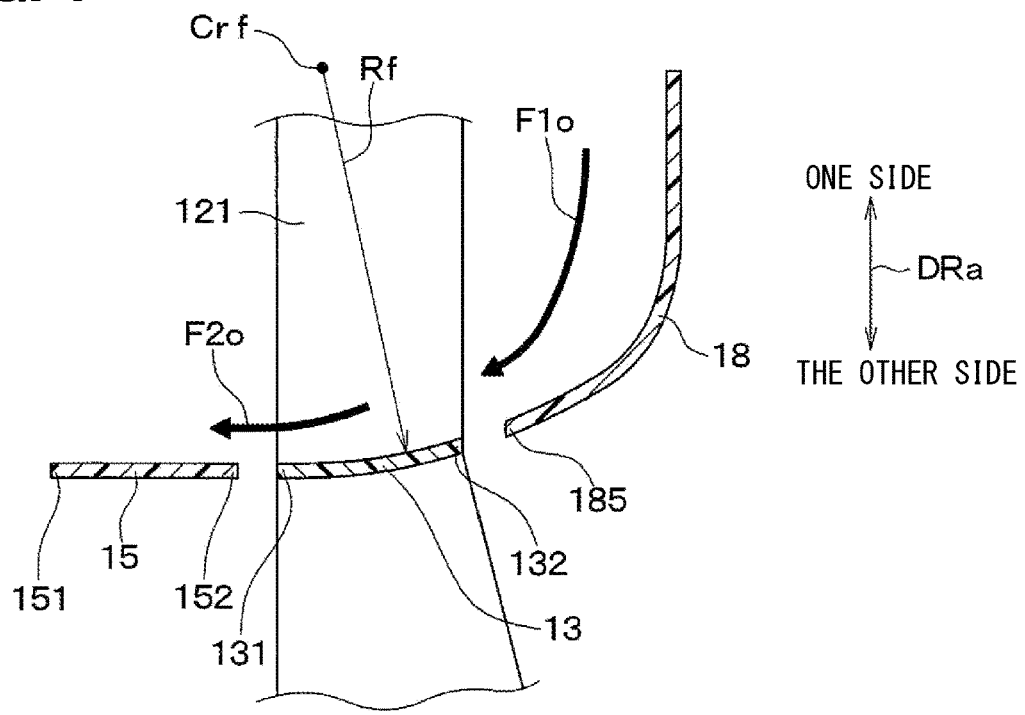
FIG. 7 is a diagram schematically showing a separation cylinder, a separation plate, and a partition plate in a vertical cross-sectional view of a centrifugal blower according to a third embodiment, corresponding to FIG. 6.

As shown in FIG. 7, in the vertical cross section of the blower 10, when the cylinder other end 185 and the separation inner end 132 are linearly complemented to connect with each other, the separation plate 13 is arranged to be continuous from the separation cylinder 18. In the vertical cross section of the blower 10, when the separation outer end 131 and the partition inner end 152 are linearly complemented so as to connect with each other, the separation plate 13 is arranged to be continuously connected to the partition plate 15. In this respect, the present embodiment is similar to the first embodiment.

However, as shown in FIG. 7, in the present embodiment, the shapes of the separation plate 13 and the partition plate 15 are different from those in the first embodiment. The arrows F1o and F2o in FIG. 7 indicate the flow of outer air.

Specifically, in the vertical cross section of the blower 10, the separation plate 13 of the present embodiment does not extend linearly. In the vertical cross section, the separation plate 13 is curved so as to expand in the fan radial direction DRr at an angle closer to the direction orthogonal to the fan axis CL as extended from the separation inner end 132 toward the separation outer end 131. In other words, in the vertical cross section of the blower 10, the separation plate 13 is curved so that the tangential direction of the separation plate 13 approaches the direction orthogonal to the fan axis CL as extended from the separation outer end 132 to the separation outer end 131.

Then, at the position of the separation inner end 132, the separation plate 13 extends toward the one side in the fan axial direction DRa obliquely while facing inward in the fan radial direction DRr. Further, the separation plate 13 extends in a direction orthogonal to the fan axis CL at the position of the separation outer end 131.

Therefore, the center Crf of the radius of curvature Rf of the separation plate 13 represented in the vertical cross section of the blower 10 is located on the one side in the fan axial direction DRa with respect to the separation plate 13. Further, the separation plate 13 represented in the vertical cross section is curved, for example, over the entire width in the fan radial direction DRr.

The partition plate 15 of the present embodiment is formed not to bend in the vertical cross section of the blower 10. As shown in FIG. 7, in the vertical cross section of the blower 10, the partition plate 15 extends straightly in the fan radial direction DRr from the partition inner end 152 to the partition outer end 151 in the direction orthogonal to the fan axis CL (see FIG. 1).

Aside from the above described aspects, the present embodiment is the same as the first embodiment. Further, in the present embodiment, the same effects as the first embodiment described above can be obtained in the same manner as in the first embodiment.

According to the present embodiment, in the vertical cross section of the blower 10, the separation plate 13 is curved so as to spread in the fan radial direction DRr at an angle closer to the direction orthogonal to the fan axis CL as extended from the separation inner end 132 to the separation outer end 131. Therefore, it is possible to reduce the pressure loss caused by the outer air colliding with the separation plate 13, while the outer air flowing along the separation cylinder 18 has a velocity component directed to the other side in the fan axial direction DRa. Then, by letting the outer air flow along the separation plate 13, the outer air is guided outward in the fan radial direction DRr while reducing the velocity component of the outer air toward the other side in the fan axial direction DRa.

Note that the present embodiment is a modification based on the first embodiment, but it is possible to combine the present embodiment with the second embodiment.

Fourth Embodiment

A fourth embodiment is described next. The present embodiment will be explained mainly with respect to portions different from those of the third embodiment.

Figure 8:
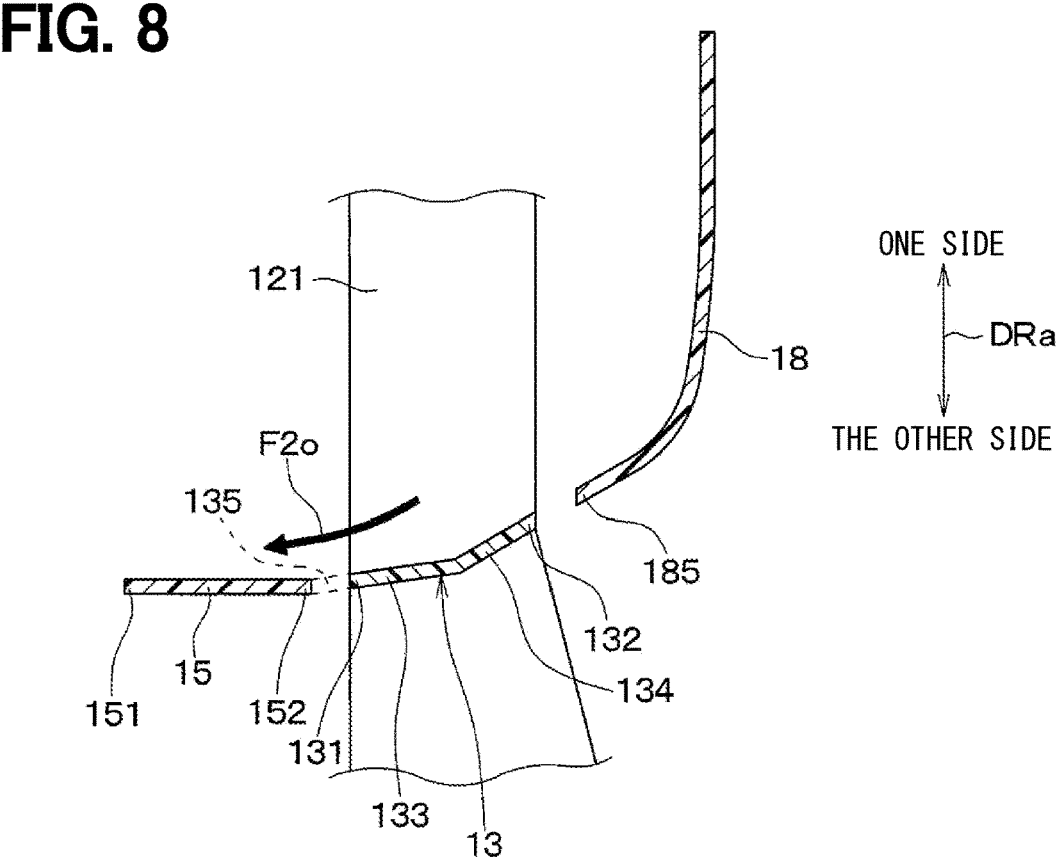
FIG. 8 is a diagram schematically showing a separation cylinder, a separation plate, and a partition plate in a vertical cross-sectional view of a centrifugal blower according to a fourth embodiment, corresponding to FIG. 6.

As shown in FIG. 8, in the vertical cross section of the blower 10, when the cylinder other end 185 and the separation inner end 132 are linearly complemented so as to connect to each other, the separation plate 13 is arranged to be continuous from the separation cylinder 18. In this respect, the present embodiment is similar to the third embodiment.

However, in the present embodiment, when the separation outer end 131 and the partition inner end 152 are linearly complemented to connect in the vertical cross section of the blower 10, the complemented portion 135 is continuously connected to the separation plate 13, but the complemented portion 135 is bent before being connected to the partition plate 15. That is, when complemented in this way, the separation plate 13 and the partition plate 15 are not connected so as to be continuous. In this respect, the present embodiment is different from the third embodiment.

Further, in the present embodiment, the shape of the separation plate 13 is different from that of the third embodiment. The separation plate 13 of the present embodiment is not curved in the vertical cross section of the blower 10.

Specifically, in the present embodiment, in the vertical cross section of the blower 10, the separation plate 13 is formed so that the angle formed by the separation plate 13 with respect to the fan axis CL gradually approaches an angle orthogonal to the fan axis CL as extended from the separation inner end 132 to the separation outer end 131.

Specifically, the separation plate 13 includes a separation outer portion 133 and a separation inner portion 134 arranged on the inner side in the fan radial direction DRr with respect to the separation outer portion 133 and connected in series with the separation outer portion 133. The separation outer portion 133 includes the separation outer end 131, and the separation inner portion 134 includes the separation inner end 132.

Then, in the vertical cross section of the blower 10, both the separation outer portion 133 and the separation inner portion 134 extend linearly so as to be located on the other side in the fan axial direction DRa as extended outward in the fan radial direction DRr. However, in the vertical cross section, the angle formed by the separation outer portion 133 with respect to the fan axis CL is close to an angle orthogonal to the fan axis CL than the angle formed by the separation inner portion 134 with respect to the fan axis CL. Therefore, the separation inner portion 134 is connected to the separation outer portion 133 so as to be bent at the boundary between the separation inner portion 134 and the separation outer portion 133.

Aside from the above described aspects, the present embodiment is the same as the third embodiment. Further, in the present embodiment, the same effects as the third embodiment described above can be obtained in the same manner as in the third embodiment.

Further, according to the present embodiment, in the vertical cross section of the blower 10, the separation plate 13 is formed so that the angle formed between the separation plate 13 and the fan axis CL gradually approaches an angle orthogonal to the fan axis CL as extended from the separation inner end 132 to the separation outer end 131. Therefore, it is possible to reduce the pressure loss caused by the outer air colliding with the separation plate 13 while flowing along the separation cylinder 18 and having a velocity component directed to the other side in the fan axial direction DRa. Then, by letting the outer air flow along the separation plate 13, the outer air can be guided outward in the fan radial direction DRr while reducing the velocity component directed toward the other side in the fan axial direction DRa.

Fifth Embodiment

A fifth embodiment is described next. The present embodiment will be explained mainly with respect to portions different from those of the first embodiment.

Figure 9:
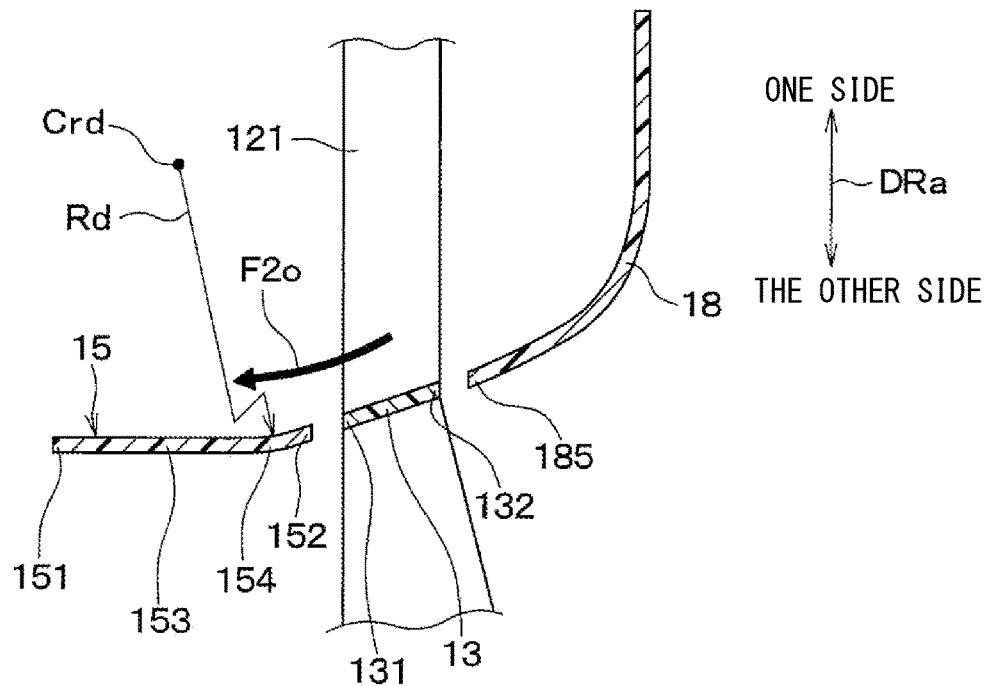
FIG. 9 is a diagram schematically showing a separation cylinder, a separation plate, and a partition plate in a vertical cross-sectional view of a centrifugal blower according to a fifth embodiment, corresponding to FIG. 6.

As shown in FIG. 9, the cylinder other end 185 and the separation inner end 132 are linearly complemented so as to connect in the vertical cross section of the blower 10, the separation plate 13 is arranged to connect continuous from the separation cylinder 18. Then, in the vertical cross section of the blower 10, when the separation outer end 131 and the partition inner end 152 are linearly complemented so as to connect, the separation plate 13 is arranged to be continuously connected to the partition plate 15. In this respect, the present embodiment is similar to the first embodiment.

However, as shown in FIG. 9, in the present embodiment, the shape of the partition plate 15 is different from that in the first embodiment.

Specifically, in the vertical cross section of the blower 10, the partition plate 15 of the present embodiment is curved so as to spread in the fan radial direction DRr at an angle closer to the direction orthogonal to the fan axis CL, as extended outward in the fan radial direction DRr from the partition inner end 152. In other words, in the vertical cross section of the blower 10, the partition plate 15 is curved so that the tangential direction of the partition plate 15 approaches the direction orthogonal to the fan axis CL as extended outward in the fan radial direction DRr from the partition inner end 152.

More specifically, in the vertical cross section of the blower 10, the partition outer portion 153 and the partition inner portion 154 are connected so as to be continuous with each other without bending at their boundary. The partition outer portion 153 extends linearly in the fan radial direction DRr over the entire length thereof, orthogonal to the fan axis CL (see FIG. 1).

In contrast, the partition inner portion 154 is curved so as to expand in the fan radial direction DRr at an angle closer to the direction orthogonal to the fan axis CL as extended outward in the fan radial direction DRr. Then, the partition inner portion 154 extends toward the one side in the fan axial direction DRa obliquely while facing inward in the fan radial direction DRr at the position of the partition inner end 152. Further, the partition inner portion 154 extends in a direction orthogonal to the fan axis CL at a position connected to the partition outer portion 153.

Therefore, the center Crd of the radius of curvature Rd of the partition inner portion 154 represented in the vertical cross section of the blower 10 is located on the one side in the fan axial direction DRa with respect to the partition plate 15.

Aside from the above described aspects, the present embodiment is the same as the first embodiment. Further, in the present embodiment, the same effects as the first embodiment described above can be obtained in the same manner as in the first embodiment.

According to the present embodiment, in the vertical cross section of the blower 10, the partition plate 15 is curved so as to spread in the fan radial direction DRr at an angle closer to the direction orthogonal to the fan axis CL as extended outward in the fan radial direction DRr from the partition inner end 152. Therefore, it is possible to gently change the flow direction of the air flowing along the partition plate 15 so as to approach the direction orthogonal to the fan axis and facing the outer side in the fan radial direction DRr. As a result, for example, it is possible to reduce the pressure loss caused by the outer air F2o colliding with the partition plate 15 after being blown out from the centrifugal fan 12.

The present embodiment is a modification based on the first embodiment and can also be combined with any of the second to the fourth embodiments.

Sixth Embodiment

A sixth embodiment is described next. The present embodiment will be explained mainly with respect to portions different from those of the first embodiment.

Figure 10:
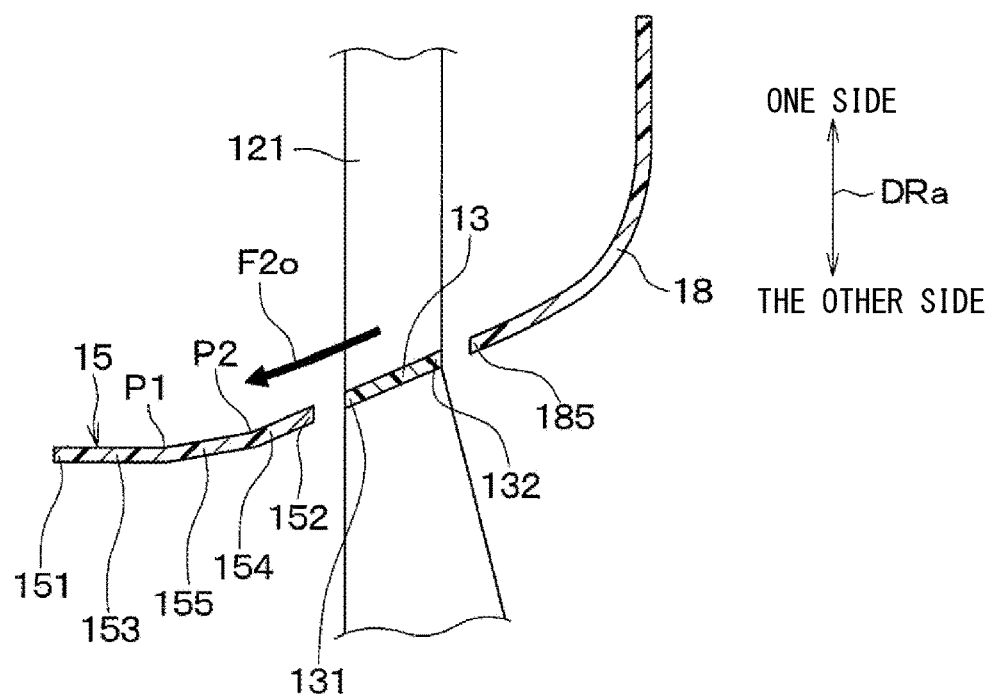
FIG. 10 is a diagram schematically showing a separation cylinder, a separation plate, and a partition plate in a vertical cross-sectional view of a centrifugal blower according to a sixth embodiment, corresponding to FIG. 6.

As shown in FIG. 10, in the vertical cross section of the blower 10, the partition plate 15 is formed such that an angle formed by the partition plate 15 with respect to the fan axis CL gradually approaches an angle orthogonal to the fan axis CL as extended from the partition inner end 152 outward in the fan radial direction DRr. In this respect, the present embodiment is similar to the first embodiment.

However, the partition plate 15 is bent at two places as shown in FIG. 10 in the present embodiment while the partition plate 15 is bent one place as shown in FIG. 2 in the first embodiment. That is, the partition plate 15 of the present embodiment has bent portions P1 and P2.

Therefore, in the present embodiment, as shown in FIG. 10, the partition plate 15 has a partition intermediate portion 155 between the partition outer portion 153 and the partition inner portion 154, in addition to the partition outer portion 153 and the partition inner portion 154. The partition intermediate portion 155 is connected to the partition outer portion 153 at the bent portion P1 and is connected to the partition inner portion 154 at the bent portion P2.

The partition intermediate portion 155 is included in a portion located on the other side in the fan axial direction DRa with respect to the partition inner end 152.

Aside from the above described aspects, the present embodiment is the same as the first embodiment. Further, in the present embodiment, the same effects as the first embodiment described above can be obtained in the same manner as in the first embodiment.

Seventh Embodiment

A seventh embodiment is described next. The present embodiment will be explained mainly with respect to portions different from those of the third embodiment.

Figure 11:
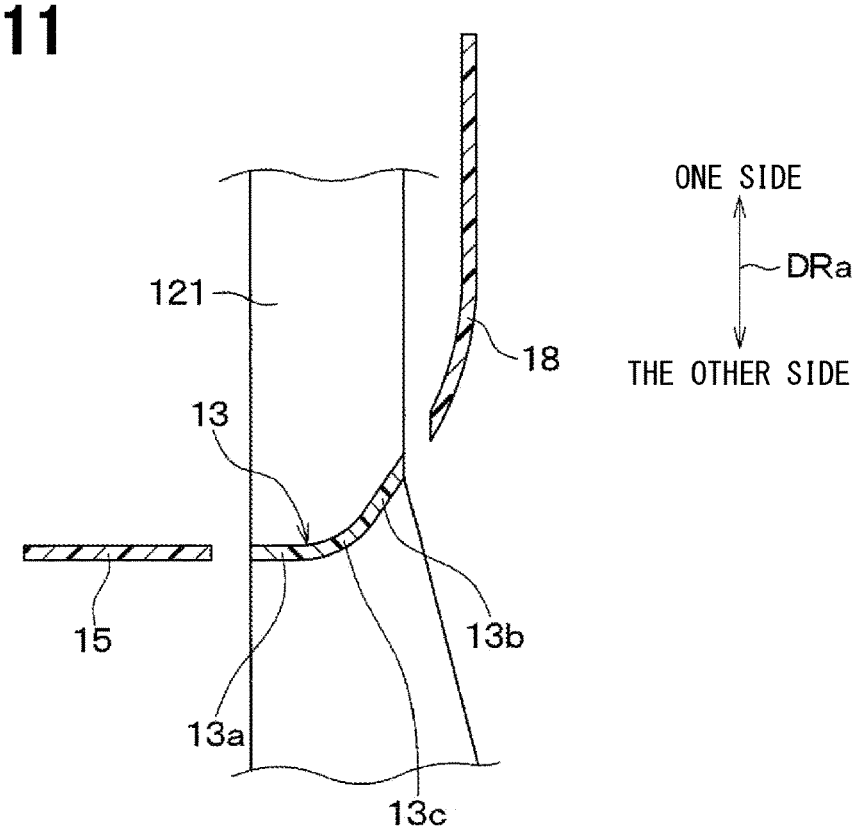
FIG. 11 is a diagram schematically showing a separation cylinder, a separation plate, and a partition plate in a vertical cross-sectional view of a centrifugal blower according to a seventh embodiment, corresponding to FIG. 6.

As shown in FIG. 11, in the present embodiment, the separation plate 13 has a curved shape in the vertical cross section of the blower 10. In this respect, the present embodiment is the same as the third embodiment. However, in the present embodiment, in the vertical cross section of the blower 10, the separation plate 13 is not curved over the entire width in the fan radial direction DRr. In this point, the present embodiment is different from the third embodiment.

Specifically, as shown in FIG. 11, in the vertical cross section of the blower 10, the separation plate 13 has the two linear portions 13a and 13b extending linearly and a curved portion 13c that is curved between two linear portions 13a and 13b. The two linear portions 13a and 13b are continuously connected with each other via the curved portion 13c.

Aside from the above described aspects, the present embodiment is the same as the third embodiment. Further, in the present embodiment, the same effects as the third embodiment described above can be obtained in the same manner as in the third embodiment.

Eighth Embodiment

An eighth embodiment is described next. The present embodiment will be explained mainly with respect to portions different from those of the fourth embodiment.

In the fourth embodiment, as shown in FIG. 8, in the vertical cross section of the blower 10, the separation plate 13 is formed so that the angle defined between the separation plate 13 and the fan axis CL gradually approaches an angle orthogonal to the fan axis CL as extended from the separation inner end 132 toward the separation outer end 131. In contrast, the separation plate 13 of the present embodiment shown in FIG. 12 is not formed as such.

Figure 12:
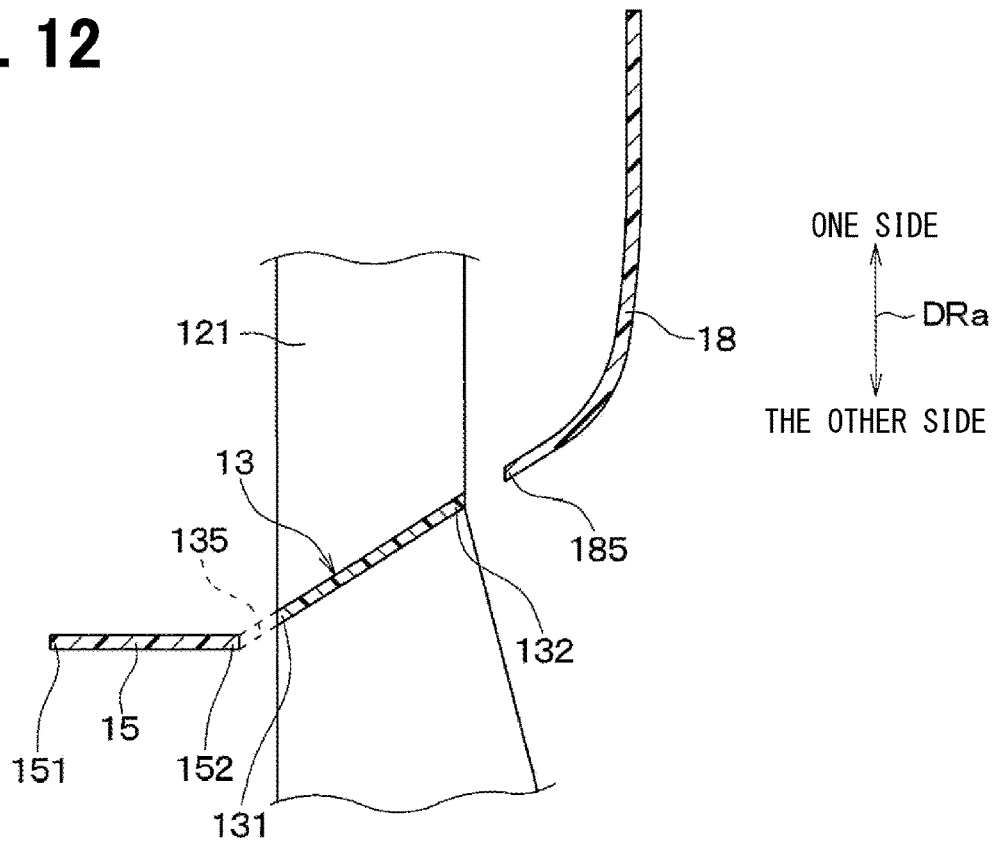
FIG. 12 is a diagram schematically showing a separation cylinder, a separation plate, and a partition plate in a vertical sectional view of a centrifugal blower according to an eighth embodiment, corresponding to FIG. 6.

Specifically, as shown in FIG. 12, the separation plate 13 of the present embodiment, like the separation plate 13 of the first embodiment, extends linearly from the separation inner end 132 to the separation outer end 131 in the vertical cross section of the blower 10.

Aside from the above described aspects, the present embodiment is the same as the fourth embodiment. Further, in the present embodiment, the same effects as the fourth embodiment described above can be obtained in the same manner as in the fourth embodiment.

Ninth Embodiment

A ninth embodiment is described next. The present embodiment will be explained mainly with respect to portions different from those of the first embodiment.

Figure 13:
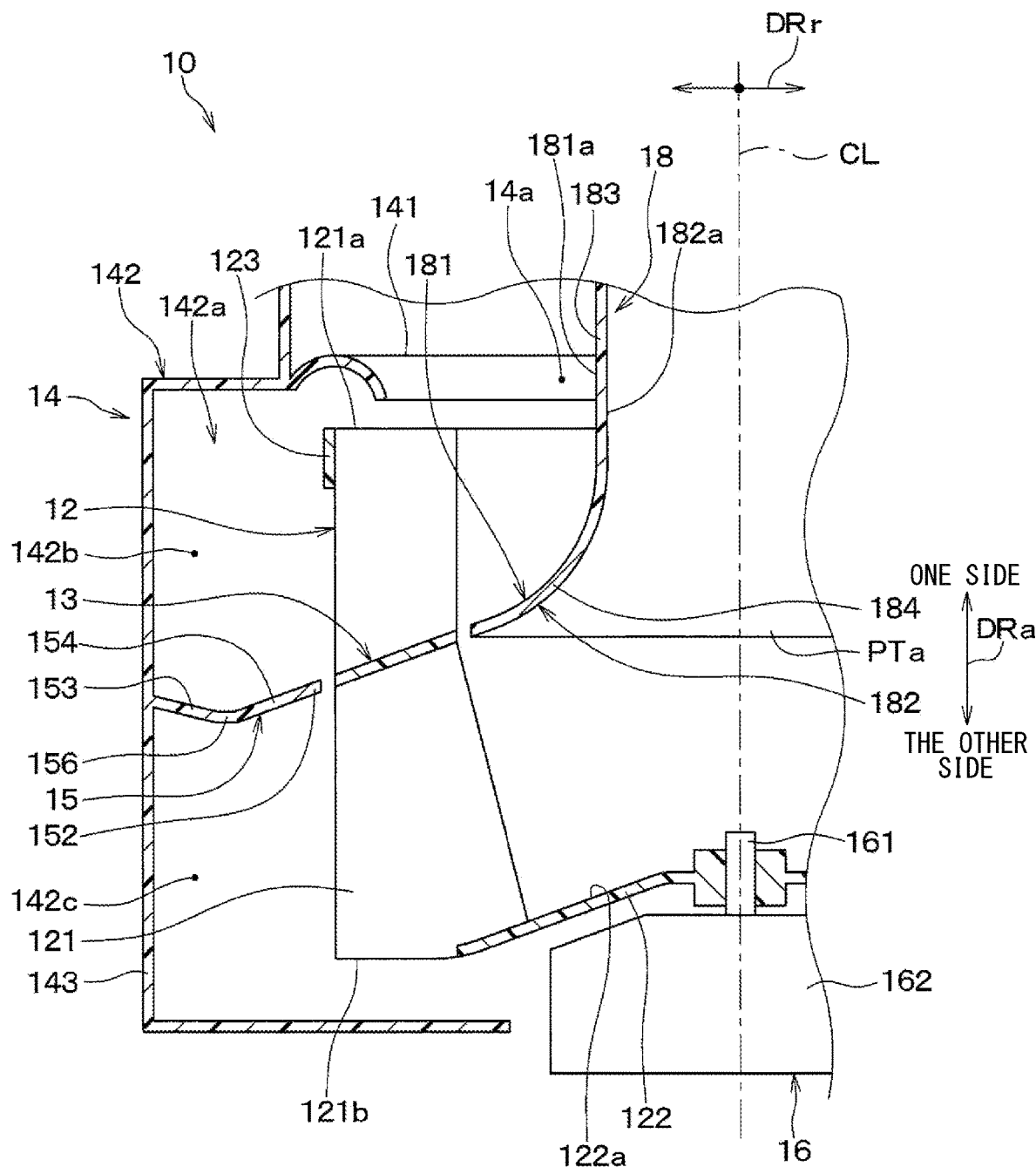
FIG. 13 is a vertical cross-sectional view showing a schematic configuration of a centrifugal blower according to a ninth embodiment, corresponding to FIG. 1.

As shown in FIG. 13, in the present embodiment, the partition plate 15 is different from the first embodiment.

Specifically, the partition inner portion 154 extends so as to be located on the other side in the fan axial direction DRa as extended outward in the fan radial direction DRr. In this respect, the partition plate 15 of the present embodiment is the same as the partition plate 15 of the first embodiment.

However, in the present embodiment, unlike the first embodiment, the partition outer portion 153 extends so as to be located on the one side in the fan axial direction DRa as extended outward in the fan radial direction DRr. Therefore, the partition plate 15 has a boundary portion 156 between the partition outer portion 153 and the partition inner portion 154, and the boundary portion 156 is located on the most other side of the partition plate 15 in the fan axial direction DRa. The boundary portion 156 is included in a portion located on the other side in the fan axial direction DRa with respect to the partition inner end 152.

Aside from the above described aspects, the present embodiment is the same as the first embodiment. Further, in the present embodiment, the same effects as the first embodiment described above can be obtained in the same manner as in the first embodiment.

The present embodiment is a modification based on the first embodiment and can also be combined with any of the second to the eighth embodiments described above.

Tenth Embodiment

A tenth embodiment is described next. The present embodiment will be explained mainly with respect to portions different from those of the first embodiment.

Figure 14:
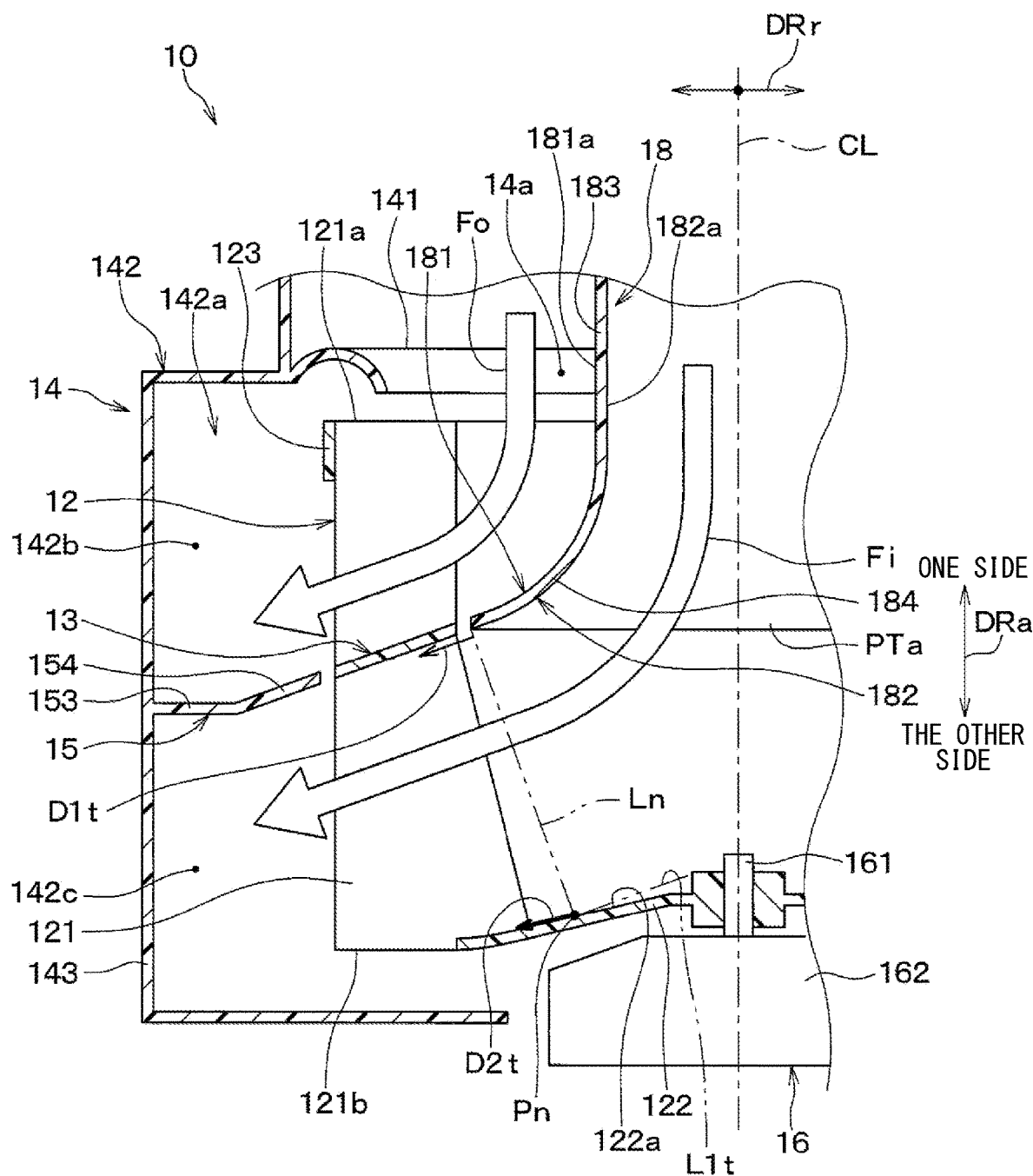
FIG. 14 is a vertical cross-sectional view showing a schematic configuration of a centrifugal blower according to a tenth embodiment, corresponding to FIG. 1.

As shown in FIG. 14, in the present embodiment, the orientation of the main plate guide surface 122a is different from that in the first embodiment.

Specifically, in the vertical cross section of the blower 10 shown in FIG. 14, the normal Ln of the cylinder inner surface 182 at the other end position PTa of the separation cylinder intersects the main plate guide surface 122a at the intersection Pn as the main plate guide surface intersection Pn. In this case, in the vertical cross section of the blower 10, the tangential direction D2t of the main plate guide surface 122a obtained at the main plate guide surface intersection Pn is close to the direction orthogonal to the fan axis CL than the tangential direction D1t of the cylinder inner surface 182 obtained at the other end position PTa of the separation cylinder.

As a result, in the present embodiment as in the first embodiment, the rate of change in the cross-sectional area of the flow path formed between the cylinder inner surface 182 and the main plate guide surface 122a through which the inner air flows can be reduced. Note that FIG. 14 shows a double chain line L1t that passes through the main plate guide surface intersection Pn in parallel with the tangential direction D1t of the cylinder inner surface 182 for easy understanding.

Aside from the above described aspects, the present embodiment is the same as the first embodiment. Further, in the present embodiment, the same effects as the first embodiment described above can be obtained in the same manner as in the first embodiment.

The present embodiment is a modification based on the first embodiment and can also be combined with any of the second to the ninth embodiments described above.

Eleventh Embodiment

An eleventh embodiment is described next. In this embodiment, the points different from the first embodiment will be mainly described, but the same points as those in the first embodiment will also be described.

Figure 15:
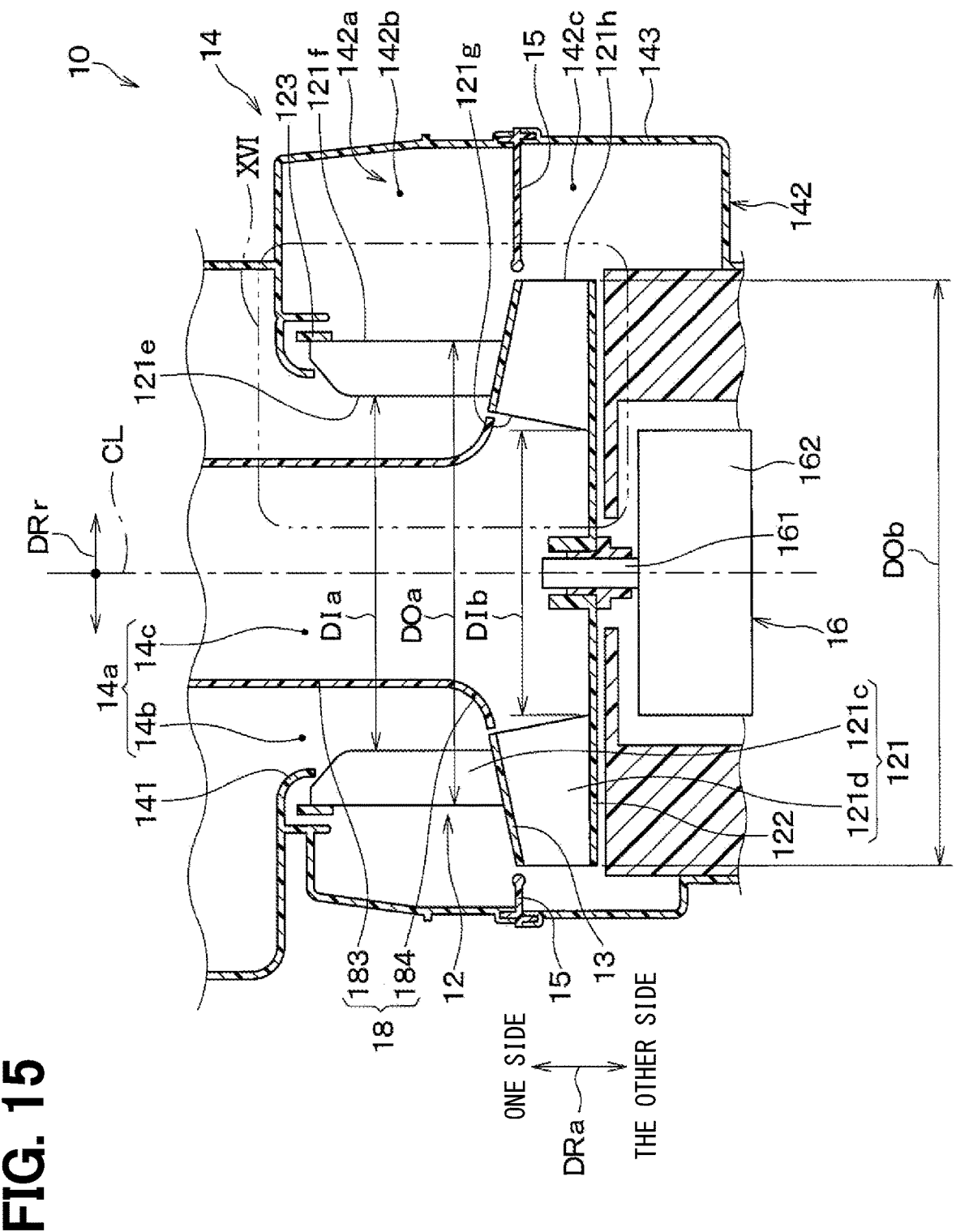
FIG. 15 is a vertical cross-sectional view showing a schematic configuration of a centrifugal blower according to an eleventh embodiment.
Figure 16:
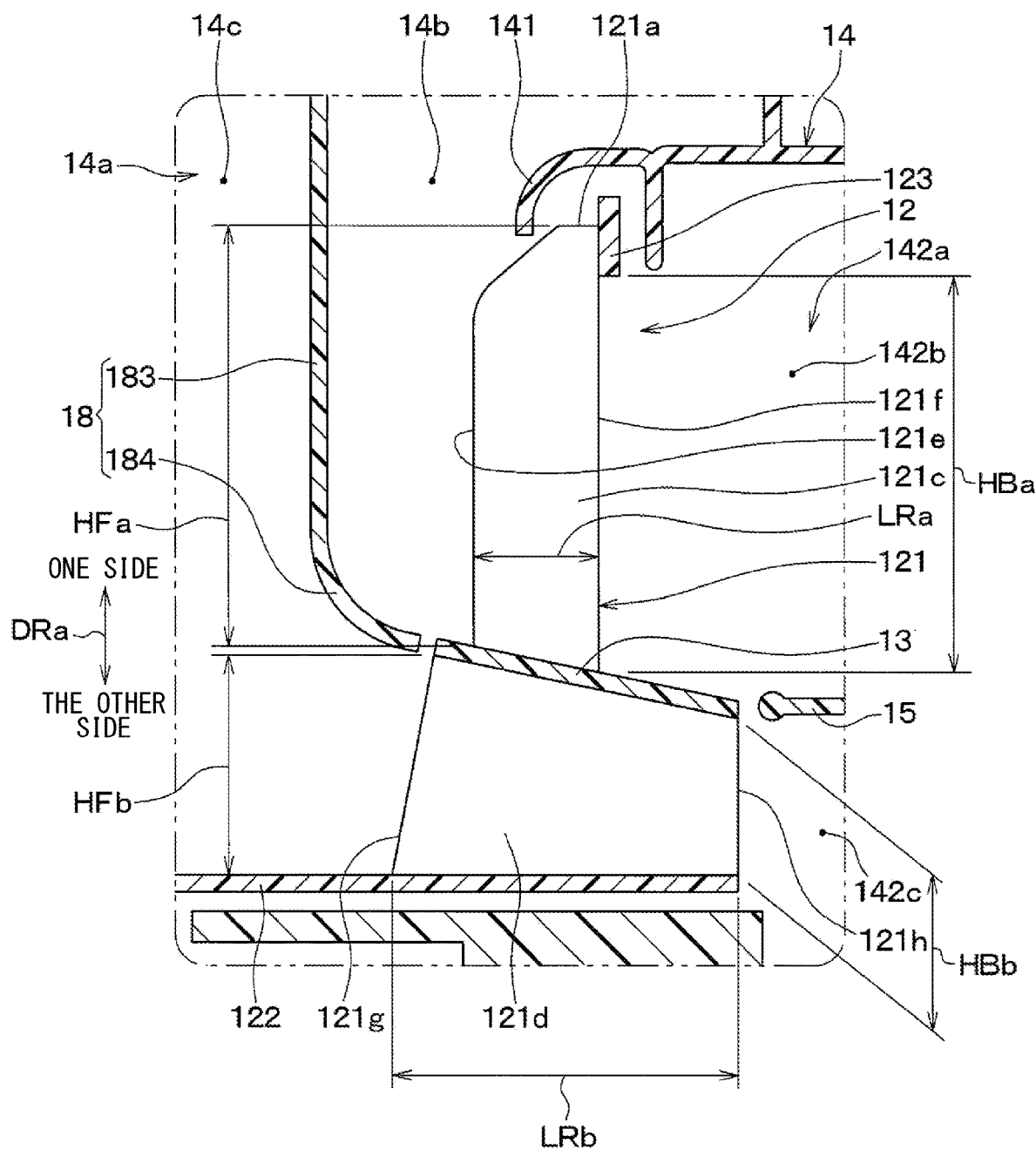
FIG. 16 is an enlarged view showing an area XVI of FIG. 15.

As shown in FIGS. 15 and 16, each of the blades 121 has a one side portion 121c and the other side portion 121d, as in the first embodiment. In the description of the present embodiment, the one side portion 121c may be referred to as one side blade, and the other side portion 121d may be referred to as the other side blade.

Further, as in the first embodiment, the suction port 14a has a cylinder outer suction port 14b formed outside the one side portion 183 of the separation cylinder 18 in the fan radial direction DRr and a cylinder inner suction port 14c formed inside the one side portion 183 in the fan radial direction DRr. The cylinder outer suction port 14b is an annular opening formed so as to surround the outer peripheral side of the cylinder inner suction port 14c.

Further, as in the first embodiment, the one side portion 121c has a front edge 121e located at the upstream end in the air flow between the one side portions 121c. The one side portion 121c has a trailing edge 121f located at the downstream end in the air flow between the one side portions 121c. That is, the front edge 121e constitutes a part of the inlet of the air passage formed between the one side portions 121c, and the trailing edge 121f is a part of the outlet of the air passage.

Similarly, the other side portion 121d has a front edge 121g located at the upstream end in the air flow between the other side portions 121d. The other side portion 121d has a trailing edge 121h located at the downstream end in the air flow between the other side portions 121d. That is, the front edge 121g constitutes a part of the inlet of the air passage formed between the other side portions 121d, and the trailing edge 121h is a part of the outlet of the air passage.

Further, as in the first embodiment, the inner diameter dimension DIb of the other side portion 121d about fan axis CL is smaller than the inner diameter dimension DIa of the one side portion 121c about the fan axis CL. More specifically, the inner diameter dimension DIb of the other side portion 121d is a diameter of a virtual cylindrical surface about the fan axis CL and in contact with the other side portion 121d at the inner side in the radial direction. In other words, the inner diameter dimension DIb of the other side portion 121d is a diameter of the virtual cylindrical surface about the fan axis CL and inscribed in the other side portion 121d. The inner diameter dimension DIa of the one side portion 121c can be described in the same manner.

As described above, the present embodiment has the same configuration as the first embodiment, but in the present embodiment, the shape of the blade 121 and the shape of the separation plate 13 are different from those of the first embodiment.

Specifically, the outer diameter dimension DOa of the one side portion 121c about the fan axis CL is smaller than the outer diameter dimension DOb of the other side portion 121d about the fan axis CL. More specifically, the outer diameter dimension DOb of the other side portion 121d is a diameter of a virtual cylindrical surface about the fan axis CL and in contact with the other side portion 121d at the outer side in the radial direction. In other words, the outer diameter dimension DOb of the other side portion 121d is a diameter of the virtual cylindrical surface about the fan axis CL and circumscribing the other side portions 121d. The outer diameter dimension DOa of the one side portion 121c can be described in the same manner.

As can be seen from the difference between the inner diameter dimensions DIb and DIa and the difference between the outer diameter dimensions DOb and DOa, the blade length LRb of the other side portion 121d in the fan radial direction DRr is longer than the blade length LRa of the one side portion 121c in the fan radial directions DRr. More specifically, the blade length LRa of the one side portion 121c is a radial width of the one side portion 121c in the fan radial direction DRr, and the blade length LRb of the other side portion 121d is a radial width of the other side portion 121d in the fan radial direction DRr. Therefore, the blade length LRa of the one side portion 121c is obtained from the equation "LRa=(DOa−DIa)/2" as shown in FIGS. 15 and 16. The blade length LRb of the other side portion 121d is obtained from the equation "LRb=(DOb−DIb)/2".

Further, as shown in FIG. 16, the height HFb of the front edge 121g in the fan axial direction DRa is smaller than the height HFa of the front edge 121e. At the same time, the height HBb of the trailing edge 121h in the fan axial direction DRa is smaller than the height HBa of the trailing edge 121f. In short, the other side portion 121d is formed to have blade shape that is longer in the fan radial direction DRr and shorter in the fan axial direction DRa than the one side portion 121c. For example, the airfoil of the one side portion 121c of the present embodiment is the airfoil of a sirocco fan, and the airfoil of the other side portion 121d is the airfoil of a turbofan.

Further, the separation plate 13 extends to the inner side in the fan radial direction DRr than the one side portion 121c. At the same time, the separation plate 13 extends to the outer side in the fan radial direction DRr than the one side portion 121c.

Aside from the above described aspects, the present embodiment is the same as the first embodiment. Further, in the present embodiment, the same effects as the first embodiment described above can be obtained in the same manner as in the first embodiment.

Further, according to the present embodiment, as shown in FIGS. 15 and 16, each of the blades 121 has the one side portion 121c and the other side portion 121d. The one side portion 121c is a portion of the blade 121 on the one side in the fan axial direction DRa with respect to the separation plate 13, and the other side portion 121d is a portion of the blade 121 on the other side in the fan axial direction DRa with respect to the separation plate 13. The separation plate 13 extends to the inner side in the fan radial direction DRr than the one side portion 121c. As a result, as compared with the case where the separation plate 13 is not provided as such, the space between the one side portion 121c and the separation cylinder 18 is increased in the fan radial direction DRr without widening the gap between the separation cylinder 18 and the separation plate 13. Therefore, it is possible to reduce the pressure loss generated in the air sucked between the one side portions 121c through the radially outer side of the separation cylinder 18.

Further, according to the present embodiment, the inner diameter dimension DIb of the other side portion 121d about the fan axis CL is smaller than the inner diameter dimension DIa of the one side portion 121c about the fan axis CL. Therefore, as compared with the case where the magnitude relation of the inner diameter dimensions DIa and DIb is not so, it is easier to gain the suction flow path area on the inner side in the radial direction with respect to the one side portion 121c, and the pressure loss generated in the air sucked into the centrifugal fan 12 can be reduced.

Further, according to the present embodiment, the inner diameter dimension DIb of the other side portion 121d is smaller than the inner diameter dimension DIa of the one side portion 121c, and the blade length LRb of the other side portion 121d is longer than the blade length LRa of the one side portion 121c. As a result, it is possible to reduce the impeller height (in other words, the fan height), which is the height of the centrifugal fan 12 in the fan axial direction DRa, without any particular demerit.

Other Embodiments (1) In the first to tenth embodiments, for example, as shown in FIG. 2, the cylinder end surface 185a is parallel to the fan axial direction DRa, but may be inclined with respect to the fan axial direction DRa. This also applies to the outer end surface 131a of the separation plate 13, the inner end surface 132a of the separation plate 13, and the partition end surface 152a.

(2) In the first to tenth embodiments, for example, as shown in FIG. 1, the width of the separation plate 13 in the fan radial direction DRr is the same as the width of the blade 121, but is limited to this. For example, the separation plate 13 may protrude outward or inward in the fan radial direction DRr with respect to the blade 121. Further, the width of the separation plate 13 in the fan radial direction DRr may be narrower than the width of the blade 121.

(3) In each of the embodiments, the centrifugal blower 10 is applied to an air conditioner, for a vehicle, having an inside-outside two-layer flow, but the application of the centrifugal blower 10 is not limited thereto. For example, the centrifugal blower 10 may be used for applications other than vehicle air conditioners.

(4) In each of the embodiments, for example, as shown in FIG. 1, the thickness of the partition plate 15, the thickness of the separation plate 13, and the thickness of the separation cylinder 18 are, for example, the same or substantially the same, but may be different from each other.

(5) In the first to tenth embodiments, for example, as shown in FIG. 1, the passage portion 142 and the partition plate 15 are integrally formed as an integrally molded product made of resin, but this is an example. The fan casing 14 may be formed by assembling the passage portion 142 and the partition plate 15 after the passage portion 142 and the partition plate 15 are formed as separate members. Further, the passage portion 142 may be composed of plural separately molded members. The same applies to the partition plate 15.

(6) In the first to tenth embodiments, for example, as shown in FIG. 1, the airfoil of the blade 121 is the airfoil of a sirocco fan in both of the one side portion 121c and the other side portion 121d, but is not limited to this.

For example, the airfoil of the one side portion 121c may be the airfoil of the sirocco fan, and the airfoil of the other side portion 121d may be the airfoil of the radial fan. On the contrary, the airfoil of the one side portion 121c may be the airfoil of the radial fan, and the airfoil of the other side portion 121d may be the airfoil of the sirocco fan. Further, the airfoil of the one side portion 121c may be the airfoil of the sirocco fan, and the airfoil of the other side portion 121d may be the airfoil of the turbofan. On the contrary, the airfoil of the one side portion 121c may be the airfoil of the turbofan, and the airfoil of the other side portion 121d may be the airfoil of the sirocco fan. Further, both the airfoil of the one side portion 121c and the airfoil of the other side portion 121d may be the airfoil of the radial fan. Further, both the airfoil of the one side portion 121c and the airfoil of the other side portion 121d may be the airfoil of the turbofan. In short, the airfoil of the one side portion 121c and the airfoil of the other side portion 121d may be the same or different from each other. The number of one side portions 121c and the number of other side portions 121d may be the same or different from each other.

(7) In the first embodiment, as shown in FIG. 2, in the vertical cross section of the blower 10, the extension direction of the separation plate 13 at the position of the separation inner end 132 is the same as the extension direction of the separation cylinder 18 at the position of the cylinder other end 185, but this is an example. For example, it can be assumed that the extension directions are different from each other. This also applies to the second and subsequent embodiments.

Further, the extension direction of the separation plate 13 at the position of the separation outer end 131 is the same as the extension direction of the partition plate 15 at the position of the partition inner end 152, but this is an example. For example, it can be assumed that the extension directions are different from each other. This also applies to the second and subsequent embodiments. The extension directions of the separation plate 13, the partition plate 15, and the separation cylinder 18 may be rephrased as gradients with respect to a predetermined reference (for example, fan axis CL).

(8) In each of the embodiments, for example, as shown in FIG. 1, the other side portion of the front edge of the blade 121 on the other side in the fan axial direction DRa with respect to the separation plate 13 is inclined with respect to the fan axial center CL. However, the shape of the front edge of the blade 121 is not limited. For example, the front edge of the blade 121 may extend from the one end 121a to the other end 121b along the fan axis CL. Further, the one side portion of the front edge of the blade 121 on the one side in the fan axis direction DRa with respect to the separation plate 13 may be inclined with respect to the fan axis CL.

(9) Note that the present disclosure is not limited to the embodiment described above, and can be variously modified. The above embodiments are not independent of each other, and can be appropriately combined except when the combination is obviously impossible.

Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number.

Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

(Overview)

According to the first aspect shown in part or all of the above embodiments, a centrifugal blower includes a centrifugal fan that blows out air sucked from one side of the fan axis in the axial direction outward in the radial direction, a fan casing, and a separation cylinder. The separation cylinder is shaped to extend in the radial direction of the centrifugal fan as extended toward the other side in the axial direction, and is expanded outward in the radial direction obliquely with respect to the axial direction, at the other end position of the separation cylinder, which is the position at the other end in the axial direction.

Further, according to the second aspect, the separation plate has a separation outer end provided on the outer side in the radial direction and a separation inner end provided on the inner side in the radial direction. Further, the separation inner end is located on the one side in the axial direction with respect to the separation outer end. Therefore, it is possible to reduce the pressure loss caused by the outer air colliding with the separation plate while flowing along the separation cylinder and having a velocity component facing the other side in the axial direction.

Further, according to the third aspect, in the vertical cross section of the centrifugal fan including the fan axis, the separation plate is curved to spread in the radial direction at an angle close to a direction orthogonal to the fan axis as extended from the separation inner end to the separation outer end. Therefore, it is possible to reduce the pressure loss caused by the outer air colliding with the separation plate while flowing along the separation cylinder and having a velocity component facing the other side in the axial direction. Then, by letting the outer air to flow along the separation plate, it is possible to guide the outer air outward in the radial direction while reducing the velocity component of the outer air toward the other side in the axial direction.

Further, according to the fourth aspect, in the vertical cross section of the centrifugal fan including the fan axis, the separation plate is formed so that the angle formed with respect to the fan axis gradually approaches the angle orthogonal to the fan axis as extended from the separation inner end to the separation outer end. Even in this way, it is possible to obtain the same effect as the effect according to the third aspect.

Further, according to the fifth aspect, the partition plate has a partition inner end provided on the inner side in the radial direction and a portion located on the other side in the axial direction with respect to the partition inner end. Therefore, the air blown out from between the blades can flow outward in the radial direction obliquely with respect to the axial direction, while having a velocity component directed to the other side in the axial direction, around the partition inner end. Therefore, it is possible to reduce the pressure loss caused by the outer air colliding with the partition plate after being blown out between the blades.

Further, according to the sixth aspect, the fan casing has an outer peripheral wall facing the blown air passage from the outer side in the radial direction. Further, the partition plate has a partition outer end provided on the outer side in the radial direction and connected to the outer peripheral wall. The partition plate is formed to extend along a direction orthogonal to the axial direction at the position of the partition outer end. Therefore, it is possible to prevent a sudden change in the flow direction of the outer air that reaches the outer peripheral wall of the fan casing along the partition plate, for example, as compared with the case where the partition plate is shaped to extend outward in the radial direction while facing the other side in the axial direction diagonally at the position of the partition outer end. As a result, it is possible to improve the output of the centrifugal blower.

Further, according to the seventh aspect, in the vertical cross section of the centrifugal fan including the fan axis, the partition plate is curved so as to spread in the radial direction at an angle close to the direction orthogonal to the fan axis as extended outward in the radial direction from the partition inner end. Therefore, it is possible to gently change the flow direction of the air flowing along the partition plate so as to approach the direction orthogonal to the fan axis and facing outward in the radial direction. As a result, for example, it is possible to reduce the pressure loss caused by the outer air colliding with the partition plate after being blown out from the centrifugal fan.

Further, according to the eighth aspect, in the vertical cross section of the centrifugal fan including the fan axis, the partition plate is formed so that the angle formed with respect to the fan axis gradually approaches the angle orthogonal to the fan axis as extended outward in the radial direction from the partition inner end. Even in this way, it is possible to obtain the same effect as the effect according to the seventh aspect.

Further, according to the ninth aspect, the separation plate has an inner end surface extending from one side to the other side in the axial direction at the position of the inner end in the radial direction. Further, the separation cylinder has a cylinder end surface extending from one side to the other side in the axial direction at the other end position of the separation cylinder. Then, in the axial direction, the other side end of the inner end surface is located on the other side than the one side end of the cylinder end surface. Therefore, as compared with the case where the other side end of the inner end surface is located on the one side than the one side end of the cylinder end surface, the two air flows separated by the separation cylinder can be restricted from mixing through the gap between the separation cylinder and the separation plate.

Further, according to the tenth aspect, the separation plate has an outer end surface extending from one side to the other side in the axial direction at the position of the outer end in the radial direction. Further, the partition plate has a partition end surface extending from one side to the other side in the axial direction at the position of the inner end in the radial direction. Then, in the axial direction, the one side end of the outer end surface is located on the one side than the other side end of the partition end surface. Therefore, as compared with the case where the one side end of the outer end surface is located on the other side than the other side end of the partition end surface, the two air flows separated by the separation plate can be restricted from mixing through the gap between the partition plate and the separation plate.

Further, according to the eleventh aspect, the centrifugal fan has a main plate arranged on the other side in the axial direction with respect to the separation cylinder and expanding in the radial direction. The main plate has a main plate guide surface on the one side in the axial direction to guide the inner air so that the inner air flows outward in the radial direction. Further, the separation cylinder has a cylinder inner surface extending to the other end position of the separation cylinder and including the inward surface facing inward in the radial direction. The main plate guide surface extends so as to be located on the other side in the axial direction as extended outward in the radial direction. In the vertical cross section of the centrifugal fan including the fan axis, the tangential direction of the main plate guide surface obtained at the intersection of the normal of the cylinder inner surface at the other end position of the separation cylinder and the main plate guide surface is the same as the tangential direction of the cylinder inner surface obtained at the other end position of the separation cylinder. Alternatively, in the vertical cross section, the tangential direction of the main plate guide surface is closer to the direction orthogonal to the fan axis than the tangential direction of the cylinder inner surface.

In the flow path formed between the cylinder inner surface and the main plate guide surface, through which the inner air flows, the circumferential length of the cross section of the flow path about the fan axis becomes longer toward the downstream side. The change in the circumferential length acts to increase the cross-sectional area of the flow path toward the downstream side. Then, assuming that the tangential direction of the cylinder inner surface is closer to the direction orthogonal to the fan axis than the tangential direction of the main plate guide surface, the change in the height of the flow path cross section shown in the vertical cross section increases the flow path cross section.

In contrast, from the eleventh aspect, the change in the height of the flow path cross section in the vertical cross section does not easily increase the flow path cross section. Therefore, the rate of change in the cross-sectional area of the flow path through which the inner air flows can be reduced as compared with the above assumed case.

Further, according to the twelfth aspect, each of the blades includes a one side portion located on the one side in the axial direction with respect to the separation plate, and the other side portion located on the other side in the axial direction with respect to the separation plate. The separation plate extends inward in the radial direction than the one side portion. As a result, the space between the one side portion of the blade and the separation cylinder can be expanded in the radial direction without expanding the gap between the separation cylinder and the separation plate as compared with the case where the separation plate is not provided as such. Therefore, it is possible to reduce the pressure loss generated in the air sucked between the one side portions through the radially outer side of the separation cylinder.

Further, according to the thirteenth aspect, the inner diameter dimension of the other side portion about the fan axis is smaller than the inner diameter dimension of the one side portion about the fan axis. Therefore, it is easy to increase the suction flow path area on the inner side in the radial direction with respect to the one side portion, and it is possible to reduce the pressure loss generated in the air sucked into the centrifugal fan.

What is claimed is:
1. A centrifugal blower comprising:
a centrifugal fan having a plurality of blades arranged around a fan axis and a separation plate to blow out air in a radial direction after being sucked from a first one side in an axial direction of the fan axis;
a fan casing housing the centrifugal fan, the fan casing having
a suction port arranged on the first one side in the axial direction of the centrifugal fan, through which air sucked into the centrifugal fan passes, and
a blown air passage provided outside the centrifugal fan in the radial direction, through which the air blown from the centrifugal fan flows,
a partition plate that partitions the blown air passage between a first air passage and a second air passage arranged on a second other side of the first air passage in the axial direction; and
a separation cylinder arranged inside the plurality of blades in the radial direction of the centrifugal fan and having a tubular shape extended in the axial direction, wherein
the separation cylinder separates the air passing through the suction port into an inner air flowing inside the separation cylinder in the radial direction and an outer air flowing outside the separation cylinder in the radial direction,
the separation plate has a plate shape that expands in the radial direction, the outer air flowing on the first one side in the axial direction with respect to the separation plate between the plurality of blades, the inner air flowing on the second other side in the axial direction with respect to the separation plate,
the partition plate is arranged so that the outer air flows from the centrifugal fan into the first air passage and the inner air flows from the centrifugal fan into the second air passage,
the separation cylinder expands in the radial direction as extending toward the second other side in the axial direction, and is shaped to extend outward in the radial direction obliquely to the axial direction at an other end position of the separation cylinder positioned at the second other side in the axial direction,
the fan casing has an outer peripheral wall facing the blown air passage from an outer side in the radial direction,
the partition plate has a partition inner end located on an inner side in the radial direction and a partition outer end located on the outer side in the radial direction and connected to the outer peripheral wall,
the partition outer end is located on the second other side in the axial direction with respect to the partition inner end,
the partition plate is shaped to expand along a direction orthogonal to the axial direction at a position of the partition outer end, and the partition plate is formed such that an angle of the partition plate formed with respect to the fan axis approaches an angle orthogonal to the fan axis as extended from the partition inner end outward in the radial direction in a vertical cross section of the centrifugal fan including the fan axis.

2. The centrifugal blower according to claim 1, wherein
the separation plate has a separation outer end located on the outer side in the radial direction and a separation inner end located on the inner side in the radial direction, and
the separation inner end is located on the first one side in the axial direction more than the separation outer end.

3. The centrifugal blower according to claim 2, wherein
the separation plate is curved so as to expand in the radial direction at an angle closer to a direction orthogonal to the fan axis, as extended toward the separation outer end from the separation inner end in the vertical cross section of the centrifugal fan including the fan axis.

4. The centrifugal blower according to claim 2, wherein
the separation plate is formed such that an angle of the separation plate with respect to the fan axis gradually approaches an angle orthogonal to the fan axis, as extended toward the separation outer end from the separation inner end in the vertical cross section of the centrifugal fan including the fan axis.

5. The centrifugal blower according to claim 1, wherein
the separation plate has an inner end surface extended from the first one side to the second other side in the axial direction at an inner end of the separation plate in the radial direction,
the separation cylinder has a cylinder end surface extended from the first one side to the second other side in the axial direction at the other end position of the separation cylinder, and
a second other end of the inner end surface of the separation plate is located on the second other side in the axial direction more than a first one end of the cylinder end surface.

6. The centrifugal blower according to claim 1, wherein
the separation plate has an outer end surface extended from the first one side to the second other side in the axial direction at an outer end of the separation plate in the radial direction,
the partition plate has a partition end surface extended from the first one side to the second other side in the axial direction at an inner end of the partition plate in the radial direction, and
a first one end of the outer end surface of the separation plate is located on the first one side in the axial direction more than a second other end of the partition end surface.

7. The centrifugal blower according to claim 1, wherein
the centrifugal fan has a main plate arranged on the second other side of the separation cylinder in the axial direction to expand in the radial direction,
the main plate has a main plate guide surface on the first one side in the axial direction to guide the inner air to flow outward in the radial direction,
the separation cylinder has a cylinder inner surface extended to the other end position of the separation cylinder and including an inward surface facing inward in the radial direction,
the main plate guide surface extends so as to be located on the second other side in the axial direction as extended outward in the radial direction,
the main plate guide surface has a tangential direction at an intersection where a normal of the cylinder inner surface at the other end position of the separation cylinder intersects the main plate guide surface in the vertical cross section of the centrifugal fan including the fan axis, and
the tangential direction of the main plate guide surface is the same as a tangential direction of the cylinder inner surface at the other end position of the separation cylinder, or is closer to a direction orthogonal to the fan axis than the tangential direction of the cylinder inner surface.

8. The centrifugal blower according to claim 1, wherein
each of the plurality of blades has
a one side portion which is a portion of the blade on the first one side in the axial direction with respect to the separation plate, and
an other side portion which is a portion of the blade on the second other side of the blade in the axial direction with respect to the separation plate, and
the separation plate extends inward in the radial direction more than the one side portion of the blade.

9. The centrifugal blower according to claim 8, wherein an inner diameter dimension of the other side portion of the blade about the fan axis is smaller than an inner diameter dimension of the one side portion of the blade about the fan axis.

* * * * *